United States Patent [19]

Stappaerts

[11] Patent Number: 5,341,236
[45] Date of Patent: Aug. 23, 1994

[54] NONLINEAR OPTICAL WAVELENGTH CONVERTERS WITH FEEDBACK

[75] Inventor: Eddy A. Stappaerts, Rancho Palos Verdes, Calif.

[73] Assignee: Northrop Corporation, Los Angeles, Calif.

[21] Appl. No.: 985,470

[22] Filed: Dec. 3, 1992

[51] Int. Cl.$^5$ ............................................. H01S 3/109
[52] U.S. Cl. .................................. 359/328; 359/326; 372/22
[58] Field of Search ................................. 372/21, 22; 359/326–332

[56] References Cited

U.S. PATENT DOCUMENTS

| | | | |
|---|---|---|---|
| 4,278,953 | 7/1981 | Chiao et al. | 359/330 X |
| 4,739,507 | 4/1988 | Byer et al. | 372/22 |
| 4,760,577 | 7/1988 | Aoshima | 372/25 |
| 4,841,528 | 6/1989 | Sipes, Jr. et al. | 372/22 |
| 4,879,722 | 11/1989 | Dixon et al. | 372/21 |
| 4,914,658 | 4/1990 | Stankov et al. | 372/21 X |
| 4,926,177 | 5/1990 | Sakata | 341/137 |
| 4,933,947 | 6/1990 | Anthon et al. | 372/34 |
| 5,054,027 | 10/1991 | Goodberlet et al. | 372/21 X |

FOREIGN PATENT DOCUMENTS

WO89/12922 12/1989 World Int. Prop. O. ...... H01S 3/10

OTHER PUBLICATIONS

IBM Technical Disclosure Bulletin vol. 13, No. 9, Feb. 1971, pp. 2795–2796, "Frequency Doubling for Mode-Locked Laser Pulses" to F. T. Byrne et al.

"Generation of 41 mW of blue radiation by frequency doubling of a GaAl/As diode laser", W. J. Kozlovsky and W. Lenth, Appl. Phys. Lett. 56 (23), Jun. 4, 1990, pp. 2291–2292.

"Efficient Second Harmonic Generation of a Diode-Laser-Pumped CW Nd: YAG Laser Using Monolithic MgO: LiNbO$_3$ External Resonant Cavities", Kozlovsky et al., IEEE Journal of Quantum Electronics, vol. 24, No. 6, Jun. 1988, pp. 913–918.

"Resonant Optical Second Harmonic Generation and Mixing", Ashkin et al., IEEE Journal of Quantum Electronics, vol. QE-2, No. 6, Jun. 1966, pp. 109–123.

*Primary Examiner*—John D. Lee
*Attorney, Agent, or Firm*—Terry J. Anderson; Robert B. Block; Karl J. Hoch, Jr.

[57] ABSTRACT

An optical frequency conversion apparatus includes at least one resonator (10) having an optical path defined by a plurality of mirrors (M1, M2). A nonlinear conversion medium (10a) is disposed within the optical path of the resonator, the nonlinear conversion medium receiving optical radiation at a first frequency and outputting optical radiation at a second frequency that is a multiple of the first frequency. One of the plurality of mirrors is an input mirror (M1) for coupling into the resonator a pulse of radiation having the first frequency, and one of the mirrors is an output mirror (M2) for out-coupling a pulse of radiation having a frequency that is a multiple of the first frequency. The input mirror has a predetermined reflectivity that is selected to cause the pulse of radiation to have an intensity sufficient to maximize, with respect to the pulse of radiation, a conversion efficiency of the nonlinear medium, without exceeding a damage threshold for the nonlinear conversion medium or for any of the plurality of mirrors. The teaching of the invention is also applied to third, fourth, and higher order harmonic generators, to optical parametric oscillators and amplifiers, and to optical mixers. Also disclosed is an intra-cavity wavefront distortion corrected second harmonic generator that compensates for heating of a nonlinear conversion medium at high average powers.

21 Claims, 14 Drawing Sheets

NONLINEAR OPTICAL WAVELENGTH CONVERTERS WITH FEEDBACK

FIELD OF THE INVENTION

This invention relates generally to nonlinear optical devices and, in particular, to devices for converting the wavelength of coherent radiation that is non-uniform in space (beam profile) and/or non-uniform in time (pulse shape).

BACKGROUND OF THE INVENTION

Nonlinear optical devices, such as frequency mixers and optical parametric converters, are widely used for generating wavelengths that cannot be generated efficiently with currently available lasers. Examples of commonly-used frequency mixers are second harmonic generators (SHGs), third harmonic generators (THGs), and fourth harmonic generators (FHGs). As an example, a SHG may receive a fundamental optical radiation signal having a wavelength of 1.06 micrometers. Through a process that occurs within a nonlinear medium, a portion of the fundamental is converted to a signal at half the wavelength, 532 nm, or twice the frequency, of the fundamental.

Also of interest are optical parametric devices, both oscillators and amplifiers, that generate continuously-tunable radiation when pumped by fixed-wavelength lasers or their harmonics.

For most applications, the efficiency of these converters should be high, preferably near the quantum limit. This is especially important when several of these devices are used in cascade, as in the case of optical parametric converters pumped by the third or fourth harmonic of, by example, a Nd:YAG laser.

The above mentioned nonlinear processes are typically represented in terms of photon energies or frequencies (o) of the interacting waves, in accordance with the following two processes:

Frequency mixing $o_1 + o_2 \rightarrow o_3$ and (1)

Parametric conversion $o_3 \rightarrow o_1 + o_2$ (2)

SHG is a special case of process (1), with $o_1 = o_2$. THG is a cascade of two mixing processes, i.e. a SHG followed by a mixer with $o_1 = o$ and $o_2 = 2o$. FHG is a cascade of two SHG processes, i.e. $o + o \rightarrow 2o$, followed by $2o + 2o \rightarrow 4o$.

Two important parameters characterizing the performance of wavelength converters are the conversion efficiency and the optical energy density, or fluence, on the nonlinear medium and the optical components of the converter system. For pulsed laser sources, the conversion efficiency is specified as an energy or a photon conversion efficiency.

The energy conversion efficiency is defined as the ratio of the energy in the output pulse(s) and the energy in the input pulse(s). The maximum value of the energy conversion efficiency is 100 percent for process (1), while for process (2) the energy conversion efficiency is equal to $o_1/o_3$ or $o_2/o_3$ for the generation of $o_1$ or $o_2$, respectively.

The photon conversion efficiency is defined as, for process (1), the ratio of the number of photons in the output pulse and the (equal) number of photons in each of the input pulses. For process (2) the photon conversion efficiency is defined as the ratio of the equal number of photons in each of the generated pulses, and the number of photons in the input pulse. For $o_1 \neq o_2$, the maximum photon conversion efficiency is 100 percent. For the degenerate case with $o_1 = o_2$, the maximum photon conversion efficiency is 50 percent for process (1), and 200 percent for process (2).

For practical applications it is desirable to maximize the conversion efficiency while minimizing the fluences (optical power densities). In particular, the fluences (optical power density) should be maintained below a value at which irreversible damage occurs either to the nonlinear medium or to optical components of the wavelength conversion system. State-of-the-art wavelength converters have conversion efficiencies well below the theoretical maximum values. For example, SHGs used with pulsed (Q-switched) Nd:YAG lasers have typical energy conversion efficiencies of 50 percent, while THGs and FHGs have energy conversion efficiencies of approximately 30 percent and 20 percent, respectively. Optical parametric converters, both oscillators (OPOs) and amplifiers (OPAs), have typical photon conversion efficiencies below 50 percent.

Techniques for increasing the efficiency of frequency mixers and optical parametric converters pumped by low power, usually continuous-wave (CW) lasers, are described by A. Ashkin, G. D. Boyd and J. M. Dziedzic: IEEE J. Quantum Electronics QE-2, p. 109–124 (1966); W. J. Kozlovsky, C. D. Nabors and R. L. Byer, IEEE J. Quantum Electronics QE-24, p. 913–919 (1988); and by W. J. Kozlovsky, W. Lenth, E. E. Latta, A. Moser and G. L. Bona, Appl. Phys. Lett. 56, p. 2291–2292 (1990). With these techniques, strong feedback is applied at the input wavelength, or the output wavelength, to increase the low efficiencies obtained with single-pass converters pumped by low power sources. The nonlinear medium is placed in a resonant cavity with mirror reflectivities close to 100% (typically 97–99%), and the cavity linear losses are maintained at very low value (typically <1%). The beam size within the nonlinear medium is made very small, typically several tens to hundreds of microns. For the case of feedback at the input wavelength, efficiency increases of several orders of magnitude can be obtained over a no-feedback case.

What is not taught by this prior art, and what is thus one object of the invention to provide, is a technique to improve the conversion efficiency for high power, pulsed laser sources. As an example, the power of a Nd:YAG laser pulse, having energy of 0.01 Joules and a pulse length of 10 nanoseconds, is $10^6$ Watts, as compared to milliWatts to several tens of Watts for a typical CW laser. The present invention overcomes the limitations in conversion efficiency which are present with high power sources. These efficiency limitations result from the fact that the laser intensity is nonuniform in both space and time, or, stated differently, the laser beam profile is not "top-hat", and the laser pulse shape is not rectangular.

These nonuniformities limit the conversion efficiency of high power, pulsed wavelength converters, in two ways. First, even though conversion efficiencies approaching the quantum limit can be obtained in the most intense part(s) of the beam/pulse, the efficiencies are lower in the spatial and temporal "wings" of the beam/pulse. In principle, this limitation could be overcome by further increasing the intensity by reducing the beam size. However, in practice this often leads to intensities and/or fluences (optical power densities) within the high intensity part(s) of the beam/pulse which exceed the damage limit of the nonlinear material and/or the optical components.

A second limitation imposed by beam/pulse nonuniformities is that the mixing and parametric processes can be reversible. Non-degenerate mixing processes are reversible except for the practically unrealistic case where the beam profiles and pulse shapes of the two input fields are identical, and the ratio of their energies is equal to the ratio of the frequencies of the two fields. Parametric processes are reversible both in the degenerate and non-degenerate cases. As an example, for the case of THG, as the intensity of the o and 2o input beams is increased, back-conversion of energy at 3o to radiation at o and 2o occurs, thus preventing simultaneous high conversion across the entire beam/pulse. Similarly, in parametric converters, reverse energy transfer occurs from the generated $o_1$ and $o_2$ waves back to the $o_3$ pump wave at sufficiently high input pump intensities.

SUMMARY OF THE INVENTION

The foregoing and other problems are overcome and the object of the invention is realized by an optical frequency conversion apparatus that includes at least one resonator for an input wave ($o_1$ and/or $o_2$ for process (1), $o_3$ for process (2)). A resonator has an optical path defined by a plurality of mirrors. A nonlinear conversion medium is disposed within the optical path of the resonator(s). For mixing processes (1), one or both input wave(s) $o_1$ and/or $o_2$ is/are resonated, while for parametric processes (2), the input (pump) wave $o_3$ is resonated. The nonlinear conversion medium receives optical radiation at two (process (1)) or one (process (2)) input frequency/frequencies, and outputs optical radiation at one (process (1)) or two (process (2)) output frequency/frequencies.

In accordance with the operating principle of parametric oscillators (process (2)), these devices also employ resonators for one or both output frequencies $o_1$ and/or $o_2$.

One of the plurality of mirrors in a resonator is an input mirror for coupling into the resonator a pulse at an input frequency. In accordance with an aspect of the invention, the input mirror has a predetermined reflectivity which is selected to cause the radiation within the resonator to have a fluence (optical energy density), in the nonlinear conversion medium, which is chosen to maximize the conversion efficiency of the wavelength conversion apparatus, without exceeding the damage threshold for the nonlinear conversion medium or any of the plurality of mirrors and other optical components, such as wavelength selection components.

In one embodiment of the invention, the predetermined reflectivity has a substantially uniform profile across a surface of the input mirror. In a further embodiment of the invention, the predetermined reflectivity has a profile that varies across a surface of the input mirror, in such a manner as to have a greater reflectivity for portions of the input beam that have a fluence (optical energy density) below the peak fluence.

In accordance with a method of the invention there is disclosed, for use in an optical frequency conversion apparatus, a method for reducing the magnitude of the fluence (optical energy density) at the input of a nonlinear conversion medium. The method includes a first step of coupling at least one pulse of radiation into an optical resonator. The step of coupling occurs at an input mirror of the resonator. A second step provides the input mirror with a predetermined reflectivity for generating an optical feedback within the resonator. An amount of optical feedback is selected so as to obtain a desired amount of nonlinear conversion efficiency with the nonlinear medium which is contained within the resonator, while maintaining the magnitude of the fluence (optical energy density) below the level required to obtain the desired degree of nonlinear conversion efficiency without the use of optical feedback.

In accordance with a further method of the invention there is disclosed, for use in an optical frequency conversion apparatus, a method for reducing the divergence angle of an input beam. A nonlinear medium has a predetermined, limited range of angular acceptance angles. A first step couples at least one pulse of radiation into a resonator, the resonator including the nonlinear conversion medium. The step of coupling occurs at the input mirror of the resonator. The method includes a further step of providing the resonator input mirror with a predetermined reflectivity for generating an optical feedback within the resonator. An amount of optical feedback is selected so as to obtain a desired amount of nonlinear conversion with the nonlinear medium. The desired degree of nonlinear conversion is obtained with a beam size that is sufficiently large to maintain the beam divergence within the range of acceptance angles of the nonlinear conversion medium.

In accordance with a further method of the invention there is disclosed, for use in an optical frequency conversion apparatus, a method for increasing the average input power for which efficient conversion can be obtained. The average power generated by the wavelength converter apparatus is limited by (a small amount of) absorption of one or more of the waves propagating through the nonlinear conversion medium. This absorption results in nonuniform heating of the nonlinear conversion medium, and therefore in wavefront distortion of beams propagating through it. This distortion reduces the amount of resonant buildup of the electric field of the input wave(s), and thereby the nonlinear conversion efficiency compared to the case of no wavefront distortion. A first step couples at least one pulse of radiation into a resonator, the resonator including the nonlinear conversion medium. The step of coupling occurs at the input mirror of the resonator. The method includes a further step of providing the resonator input mirror with a predetermined reflectivity for generating an optical feedback within the resonator. An amount of optical feedback is selected so as to obtain a desired amount of nonlinear conversion with the nonlinear medium. The method includes a further step of providing the resonator with a spatial light modulator (SLM) which compensates for the optical distortion on an input wave, thereby enabling maximum resonant electric field buildup in the resonator. The SLM is a phase modulator such as a deformable mirror or a phase modulator array.

BRIEF DESCRIPTION OF THE DRAWINGS

The above set forth and other features of the invention are made more apparent in the ensuing Detailed Description of the Invention when read in conjunction with the attached Drawings, wherein:

FIGS. 4a and 4b illustrate two representative embodiments of a third harmonic generator that include a second harmonic generator cascaded with a frequency mixer, wherein FIG. 4a shows a frequency mixer based on a linear resonator, while FIG. 4b shows a single, common ring resonator for the o and 2o input fields;

DETAILED DESCRIPTION OF THE INVENTION

It is noted at the outset that this invention applies not only to second order nonlinear processes described by processes (1) and (2) above, but also to higher order processes including, but not limited to, third order nonlinear processes such as four-wave-mixing and Raman scattering. In the ensuing description the nonlinear medium is referred to as a crystal, in that nonlinear crystals are the most commonly used nonlinear material. It should be realized, however, that the invention may be practiced with other than crystalline nonlinear materials. By example, nonlinear polymers may be employed. Furthermore, a gas, such as sodium vapor, or a liquid, such as $CS_2$, may be employed as the nonlinear medium.

In general, the invention employs feedback on the input beam(s) of wavelength converters to increase the conversion efficiency and/or reduce the optical fluence (optical energy density) on the nonlinear crystal and optical components, thereby increasing the reliability and extending the lifetime of these components. The technique of efficiency enhancement and/or fluence (optical energy density) reduction is the same for both processes (1) and (2).

Figure 1A:
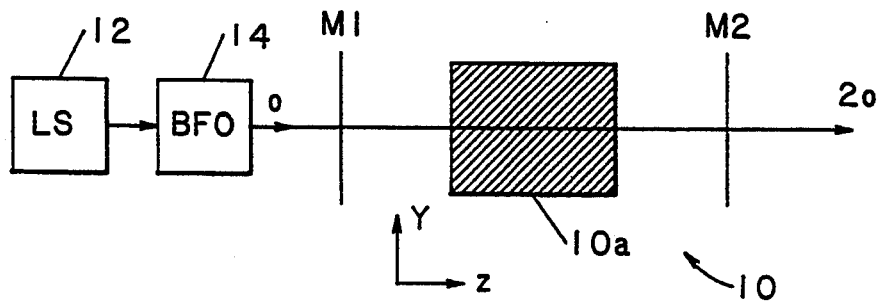
FIG. 1a is a schematic diagram of a second harmonic generator configured as a linear resonator.
Figure 1B:
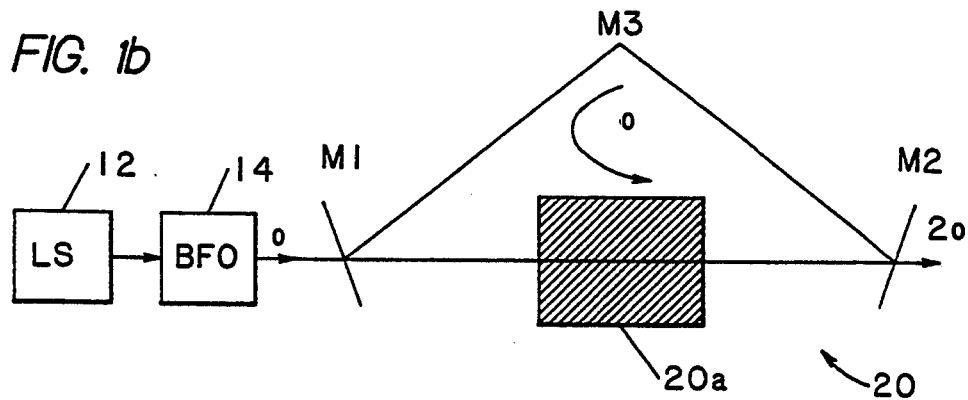
FIG. 1b is a schematic diagram of a second harmonic generator configured as a ring resonator.

FIGS. 1a and 1b are schematic diagrams of representative embodiments of the present invention, as applied specifically to SHGs. FIGS. 1a and 1b illustrate optical resonators 10 and 20, respectively. These resonators are bounded by mirrors M1, M2, and M1, M2, M3, respectively. Each resonator includes a nonlinear optical medium, such as a crystal 10a and 20a, respectively. By example only, crystals 10a and 20a are comprised of dihydrogen phosphate (KDP). Other suitable crystals include, but are not limited to, ADP, $LiNbO_3$, BBO, and LBO. The length of the resonator is such that the wavelength of the input beam coincides with a resonance (longitudinal mode), thereby producing constructive interference of successive roundtrips within the resonator. The reflectivity of the input mirror M1 is equal to a desired amount of optical feedback and is relatively low as compared to the prior art, low power CW approaches. That is, the reflectivity of the input mirror M1 is typically on the order of a few tens of percent, and is preferably within a range of approximately 10 percent to approximately 50 percent, with 20 percent being a typical value. The reflectivity may be uniform across the mirror, or it may be given a predetermined reflectivity profile, as described below.

Also shown in FIGS. 1a and 1b is a laser source (LS) 12, and beam forming optics (BFO) 14. The BFO 14 is conventional in construction and typically includes a telescope having two or more lenses. The purpose of the BFO 14 is to deliver a desired beam size to the nonlinear crystal within the resonator. The LS and BFO are shown only for the embodiments of FIGS. 1a and 1b, it being understood that similar optical components are included with the other embodiments illustrated in, by example, FIGS. 4a, 4b, 6, 8, 9, and 11.

It is well known that a "local" conversion efficiency in an SHG (i.e. at a certain spatial position within the beam and at a certain time within the pulse) is proportional to the local intensity. It is therefore largest in that portion of the beam (space) and pulse (time) where the intensity is maximum.

The feedback mechanism of the invention exploits this property of nonlinear wavelength conversion to provide a maximum intensity enhancement when the resonator losses are smallest, i.e. where the conversion to the second harmonic (SH), which represents a loss for the input beam, is at a minimum in the absence of feedback. The feedback mechanism thus has little effect on those portions of the beam/pulse where the SH conversion is large, even without feedback. However, the feedback mechanism significantly enhances wavelength conversion in the lower intensity parts of the beam/pulse. The result is an increase in the overall conversion efficiency.

Figure 14A:
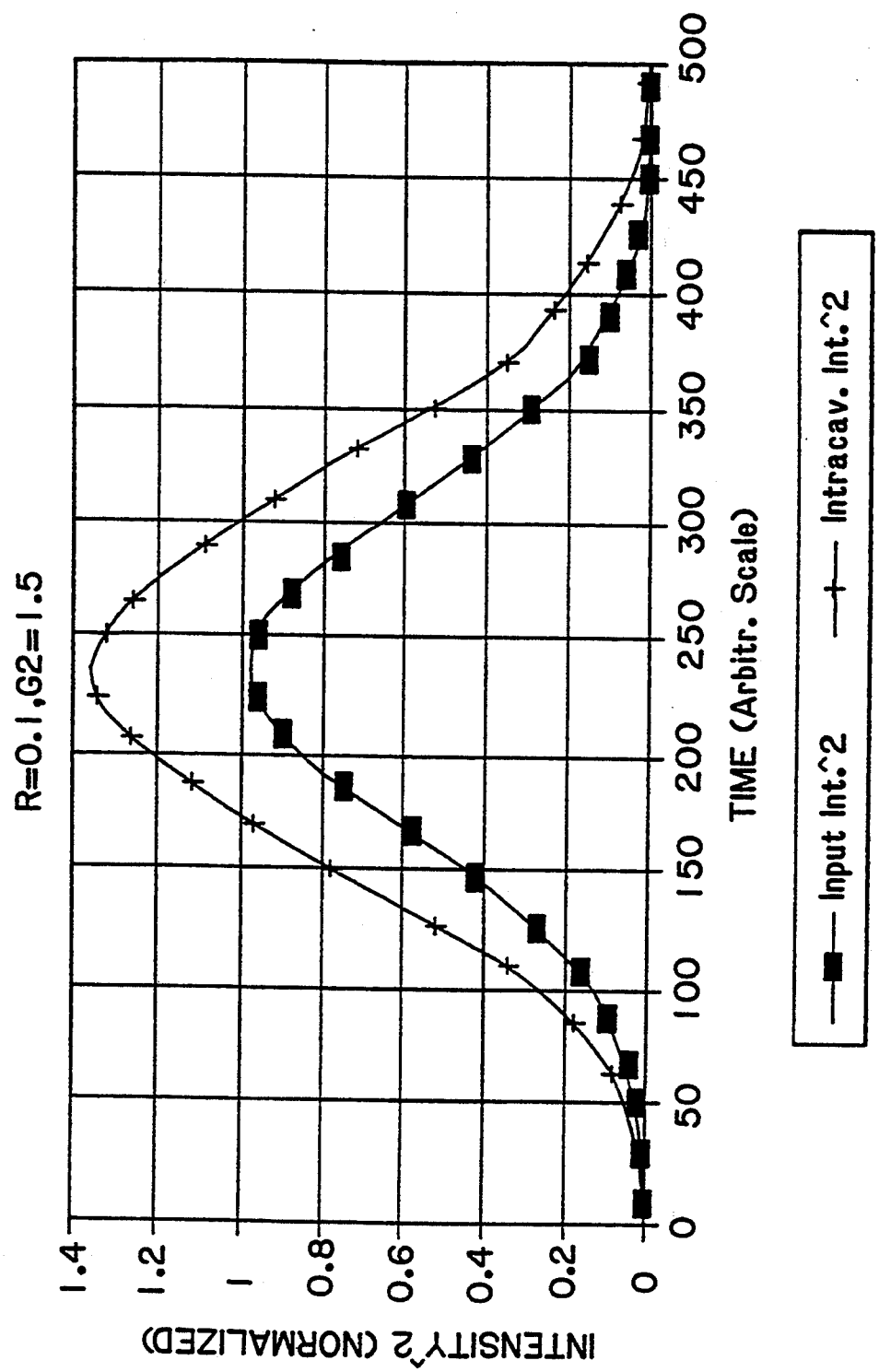
FIG. 14a illustrates the effect of feedback on the temporal shape of the laser intensity near the center of a Gaussian beam, in a resonator with feedback.
Figure 14B:
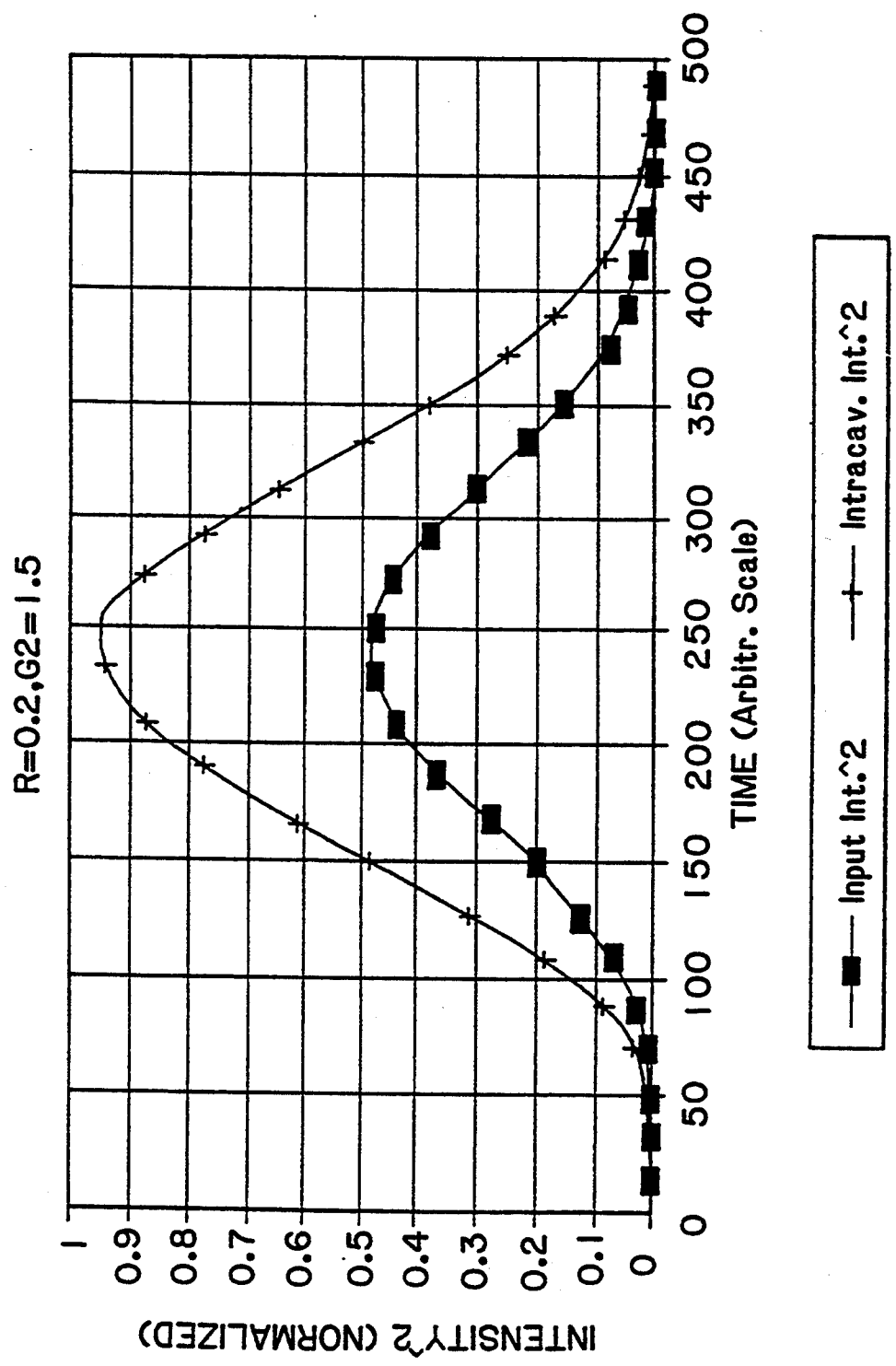
FIG. 14b illustrates the effect of feedback on the temporal shape of the laser intensity in the wings of a Gaussian beam, in a resonator with feedback.

This can be seen in FIGS. 14a and 14b. The input beam has a Gaussian profile with maximum intensity in the center of the beam. That is, the pulse shape of the input radiation is Gaussian. FIGS. 14a and 14b show the temporal shape of the square of the intensity near the center of the beam, at the input face of the nonlinear crystal both without and with feedback, and also show the corresponding intensities at a point in the wings of the beam, where the intensity of the input beam is lower. For both positions in the beam, the temporal shape of the intensity with feedback is more nearly rectangular as compared to no feedback. Also, off beam center, the intensity with feedback is considerably enhanced compared to no feedback. Both the more rectangular temporal shape and the enhancement of the intensity with feedback result in a larger conversion efficiency. For a resonator input mirror with tapered reflectivity, which is described below, the intensity enhancement factor off beam center is even larger compared to a constant reflectivity profile, and the conversion efficiency increase is correspondingly greater.

As was stated above, the conversion efficiency may be further enhanced by employing a tapered feedback across the pump beam profile. As an example, consider Gaussian or super-Gaussian beam profiles, which are described by:

$$I(r) = I_0 \exp(-2(r/w)^n),$$

where w is the waist size of the beam, where n=2 for Gaussian beams, and where n>2 for super-Gaussian beams. These profiles have a peak intensity in the center of the beam (r=0), and a smoothly decreasing intensity with increasing r. A mirror reflectivity which increases with r provides an increasing amount of feedback as the input intensity decreases, thereby enhancing the resonator intensity and conversion efficiency. One suitable taper profile is:

$$R_f(r) = R_0(1 + b(r/w)^2),$$

where $R_0$ is the reflectivity in the center of the beam, and b is a parameter that determines the degree of tapering.

Figure 13:
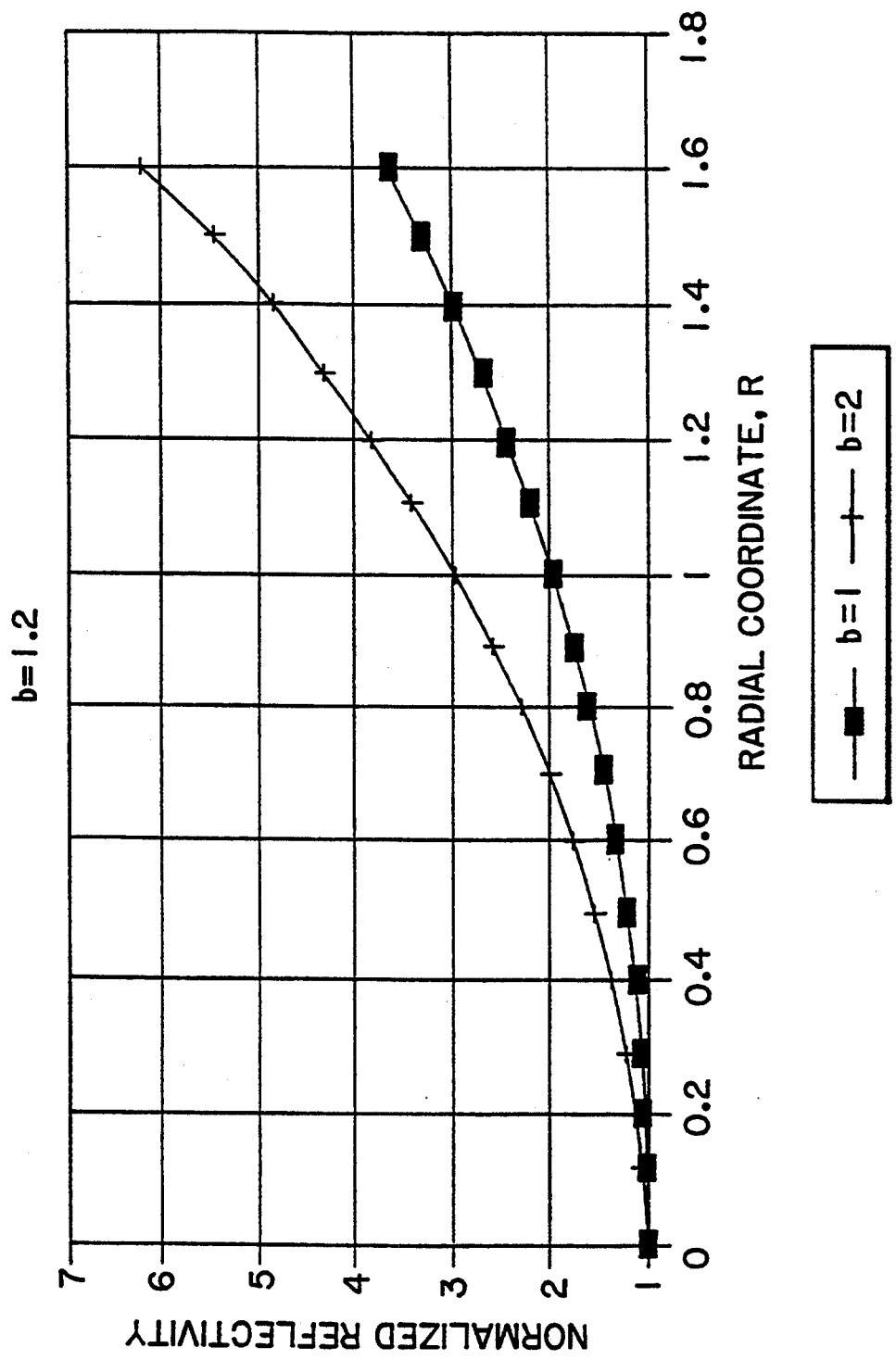
FIG. 13 graphically illustrates tapered feedback mirror reflectivities for b=1 and b=2.

Reference is made to FIG. 13 which illustrates exemplary reflectivity profiles for a b=1 case and a b=2 case. As can be seen, both profiles are generally parabolic with the slope being steeper for the b=2 case. For b=0 the profile is uniform across the mirror surface.

It should be noted that other reflectivity profiles may be employed instead of the generally parabolic shapes illustrated. For example, a complex reflectivity profile may be employed so as to match predetermined intensity profile characteristics of the incident laser beam.

In FIGS. 1a and 1b the nonlinear crystals 10a and 20a are enclosed within the resonator structure. Both linear (FIG. 1a) and ring-resonator (FIG. 1b) configurations may be used. In general, linear resonators (FIG. 1a) contain fewer optical elements, but, due to the non-zero reflectivity of M1, feedback into the laser source may occur, necessitating the use of an optical isolator (not shown). For ring resonators (FIG. 1b), the geometry (triangle, rectangle) and the number of mirrors are primarily determined by coating requirements at both the input and second harmonic wavelengths.

Both resonator configurations contain the partially-reflecting feedback mirror (M1) through which the laser beam is injected. Out-coupling of the SH beam can be accomplished through any of the resonator mirrors, the optimum mirror being determined by considerations such as coating realizability and system packaging.

For optimum performance, the laser radiation and the resonator should satisfy the following conditions:

1. the spectrum of the laser source has a single longitudinal mode, or, if it is multi-mode, the laser and nonlinear device resonator have substantially identical longitudinal mode structures;
2. the laser wavelength coincides with a resonance of the resonator structure, or, if multi-mode, its modes coincide with resonances of the resonator structure;
3. linear losses in the resonator at the input wavelength, other than those associated with the input mirror coupling, should be low;
4. phase distortions on the laser wavefront, the resonator mirrors, the nonlinear crystal (both surface and bulk), and any other resonator components (not shown) should be small (compared to pi radians);
5. the roundtrip length of the resonator should be short compared to the laser pulse length; and
6. the laser polarization should be matched to the requirements for maximum conversion efficiency (depending on crystal symmetry).

Conditions 1-5 ensure that the resonator electric field at the input frequency builds up constructively over multiple roundtrips. For the case of a laser with a single longitudinal mode, condition 2 may be satisfied either by controlling the frequency of the resonator longitudinal modes (e.g. by controlling the resonator length), or by adjusting the laser frequency to coincide with a resonator longitudinal mode. Condition 6 is required for the operation of the SHG, irrespective of the use of feedback. When the above conditions are satisfied, a local intensity enhancement factor is approximately given by:

$$E(x,y,t) = (1 - R_f)/(1 - R_f^{\frac{1}{2}} e^{-a}),$$

where $R_f$ is the reflectivity of the feedback mirror, and where a(x,y,t) is the roundtrip attenuation of the input electric field due to both linear losses and nonlinear conversion to the SH field. For the limiting case of zero losses, i.e. a=0, the square of the maximum intensity enhancement factor is given by:

$$E_{max}^2 = [(1+R_f^{\frac{1}{2}})/(1-R_f^{\frac{1}{2}})]^2$$

For typical $R_f$ values of 0.1 and 0.2, $E_{max}^2$ has values of 3.7 and 6.8, respectively.

Figure 2A:
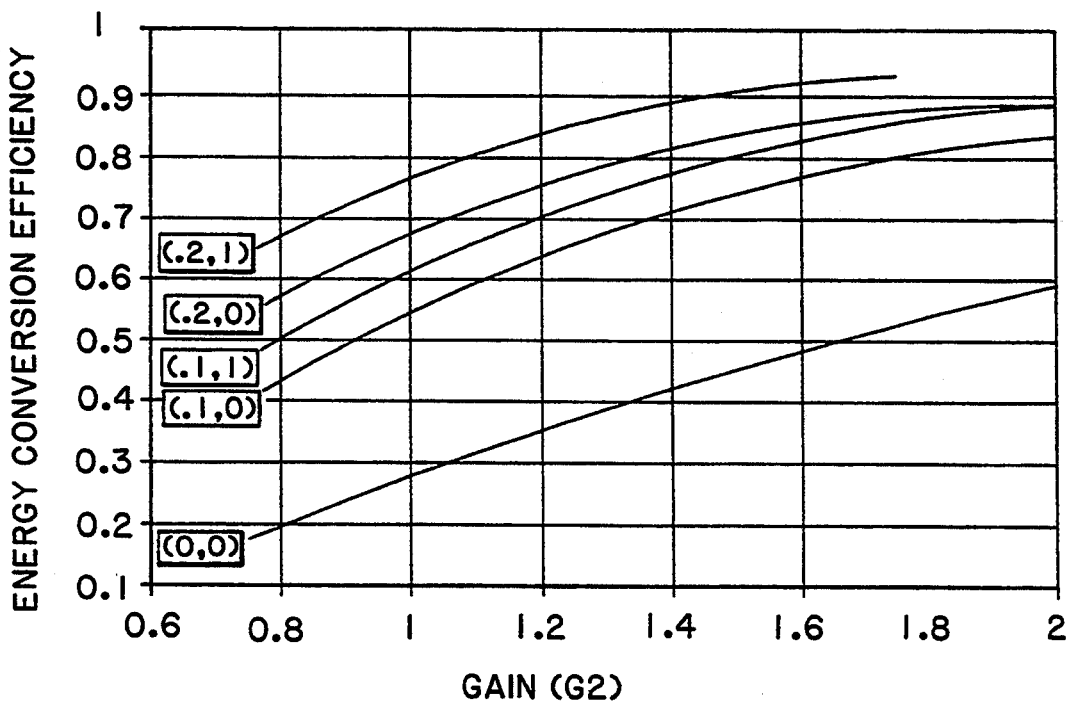
FIG. 2a is a graph that illustrates, for laser radiation having a Gaussian beam and Gaussian pulse shape, the energy conversion efficiency versus gain for the second harmonic generators of FIGS. 1a and 1b.
Figure 2B:
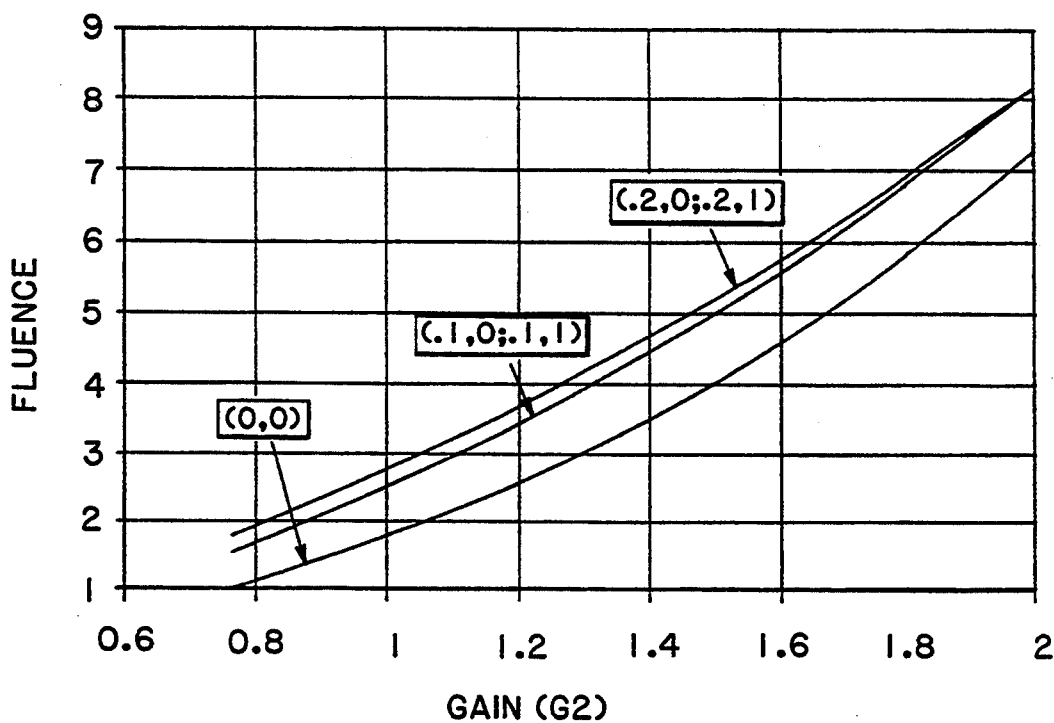
FIG. 2b is a graph that shows, for the same laser radiation, the fluence (optical energy density) on the input face of a nonlinear crystal that is a component of the resonators of FIGS. 1a and 1b.

Ideal mirror reflectivities for the two SHG configurations are as follows:
Configuration of FIG. 1a:
  Mirror M1: $R_1 = R_f$ at o
  Mirror M2: $R_2 = 1$ at o, $R_2 = 0$ at 2o
Configuration of FIG. 1b:
  Mirror M1: $R_1 = R_f$ at o
  Mirror M2: $R_2 = 1$ at o, $R_2 = 0$ at 2o
  Mirror M3: $R_3 = 1$ at o A number of variations are within the scope of the invention. As an example, in FIG. 1b the o-beam may be coupled in through M3, and the 2o beam coupled out through M3. The mirror reflectivities for this case would be as follows:
  Mirror M1: $R_1 = 1$ at o
  Mirror M2: $R_2 = 1$ at o and 2o
  Mirror M3: $R_3 = R_f$ at o, $R_3 = 0$ at 2o FIG. 2a shows the SHG energy conversion efficiency and FIG. 2b the fluence (optical energy density) at the input face of the crystal for various amounts of feedback, for the case where both the beam shape and the pulse shape are Gaussian. The gain parameter, $G_2$, describes the strength of the nonlinear interaction and is proportional to:

$$G_2 \approx d_c L_c I_o^{\frac{1}{2}}$$

where $d_{eff}$ is the effective nonlinear optical coefficient of the crystal, $L_c$ the crystal length, and $I_o$ the peak input intensity. The parameters labeling the curves are ($R_1$, $b_1$) where $R_1$ is the reflectivity at frequency o at the center of the beam, and $b_1$ determines the degree of tapering:

$$R_{f1}(r) = R_1(1 + b_1(r/w)^2),$$

where r is the radial coordinate and w the waist size.

Without feedback, 60% energy conversion efficiency is obtained at $G_2 = 2$, at a fluence (optical energy density) of 7 (arbitrary units). With 20% uniform feedback ($R_f = 0.2$), the same efficiency is obtained at $G_2 = 0.9$, at a fluence (optical energy density) of only 2.4. Therefore, with feedback, the fluence (optical energy density) on the crystal is reduced by a factor of 2.9.

Alternately, at $R_f = 0.2$ and $G_2 = 1.75$, an efficiency of 85% is obtained at a fluence (optical energy density) of 6.6, which is below the fluence at 60% conversion without feedback. With a quadratic reflectivity profile ($R_f = 0.2$, b=1) a greater efficiency of 90% is obtained at a fluence (optical energy density) of 5. It is noted that a tapered feedback profile does not increase the peak fluence (optical energy density) on the crystal, but instead increases the fluence (optical energy density) in the lower intensity parts of the beam to values nearer the peak values obtained at the intensity maximum of the input beam.

Since $G_2$ is proportional to the square root of the intensity, an operating point with $G_2 = 1$ corresponds to an intensity four times lower than for $G_2 = 2$. For a given laser power, this reduced intensity results in a four times larger beam area, and therefore a two times larger beam diameter and a two times lower beam divergence in both the x,z and y,z planes, where z is the propagation direction (for the case of a round beam). This reduced divergence is frequently important because of the small acceptance angle of many crystals, the angular acceptance criteria resulting from phase-matching requirements.

Figure 3A:
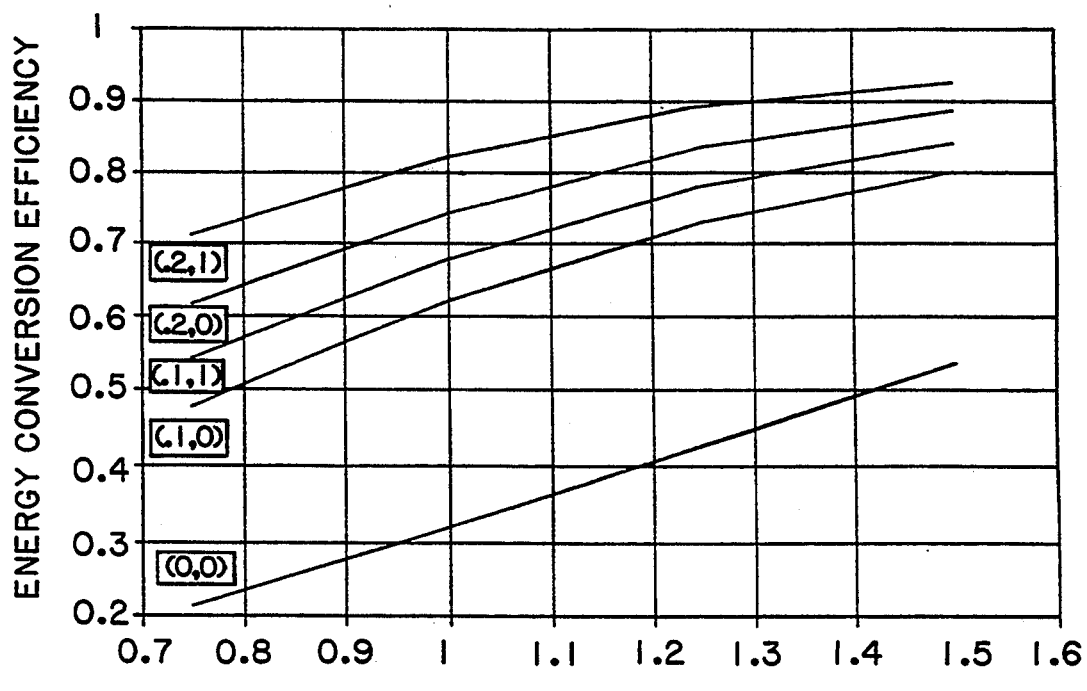
FIG. 3a is a graph that illustrates, for laser radiation having a super-Gaussian beam and a Gaussian pulse shape, the energy conversion efficiency versus gain for the second harmonic generators of FIGS. 1a and 1b.
Figure 3B:
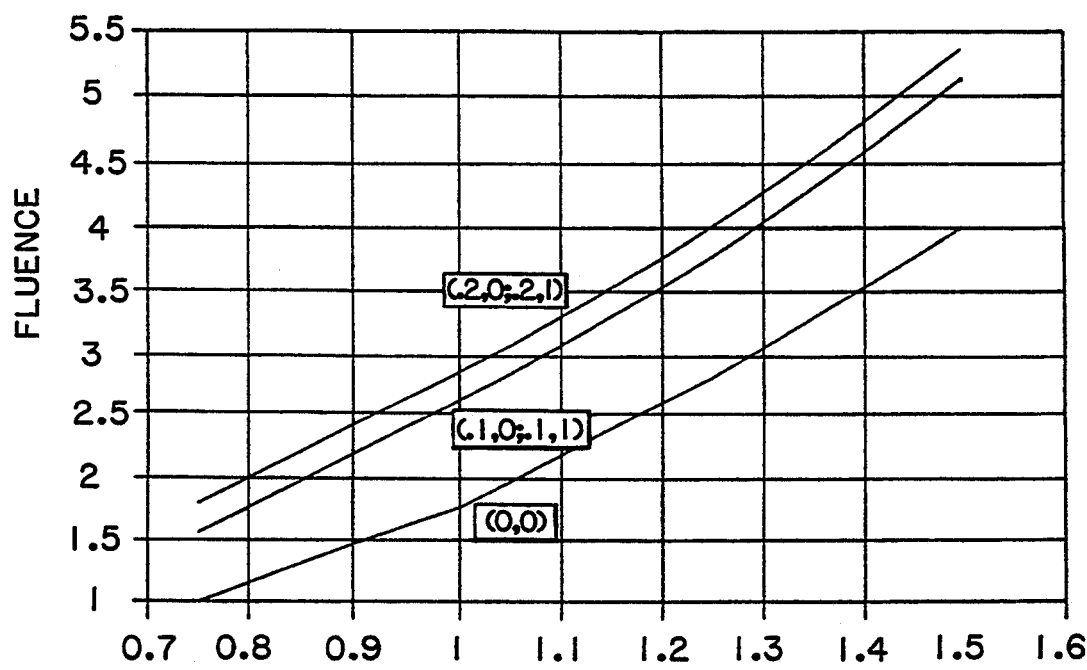
FIG. 3b is a graph that shows, for the same laser radiation, the fluence (optical energy density) on the input face of a nonlinear crystal that is a component of the resonators of FIGS. 1a and 1b.

FIGS. 3a and 3b show the conversion efficiency of a SHG pumped by a laser beam with a super-Gaussian (n=3) beam profile. The performance improvements over the no-feedback case are similar to the Gaussian beam case of FIGS. 2a and 2b, but even higher efficiencies are achievable.

Figure 4A:
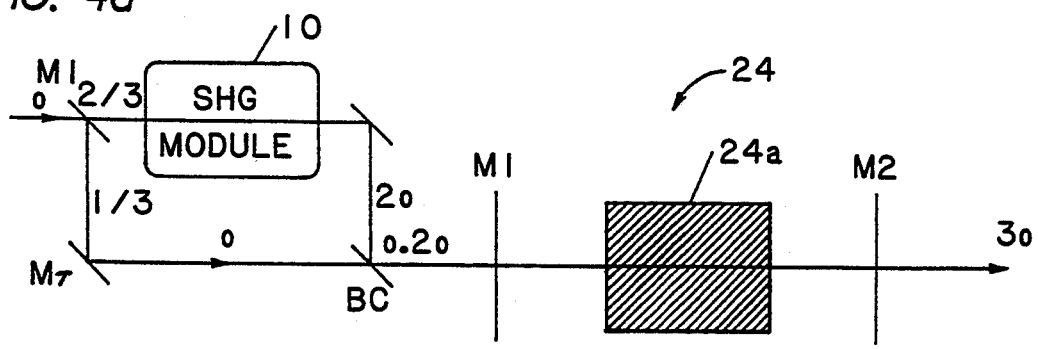
Figure 4B:
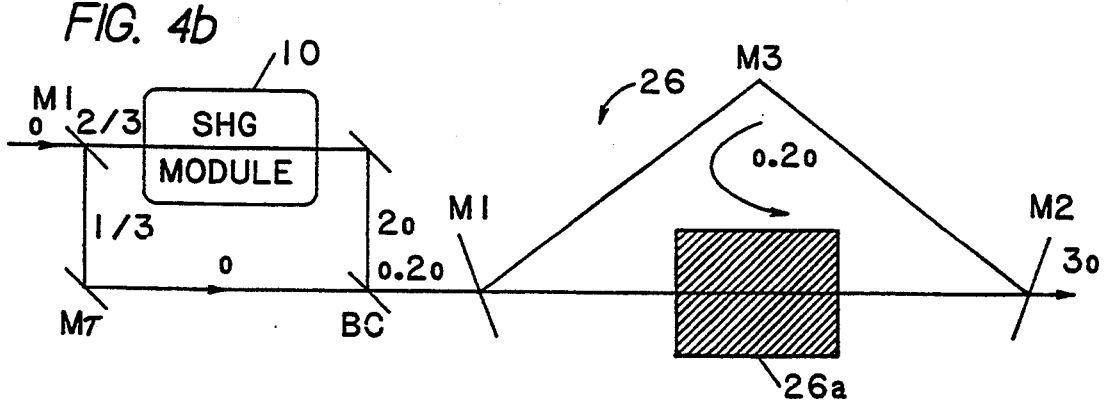
Figure 5A:
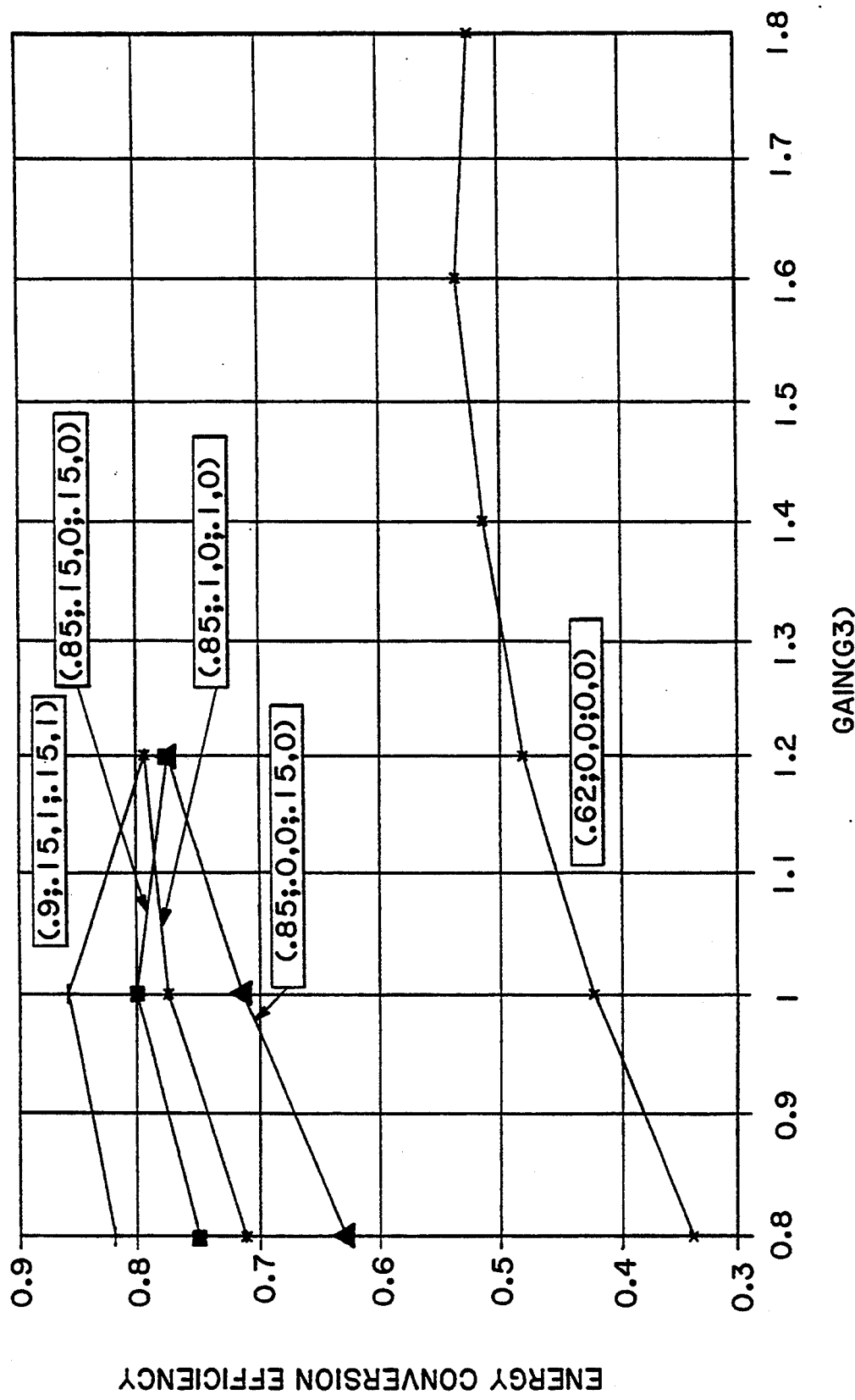
FIG. 5a is a graph that illustrates, for laser radiation having a Gaussian beam and a Gaussian pulse shape, the energy conversion efficiency versus gain for the third harmonic generators of FIGS. 4a and 4b.
Figure 5B:
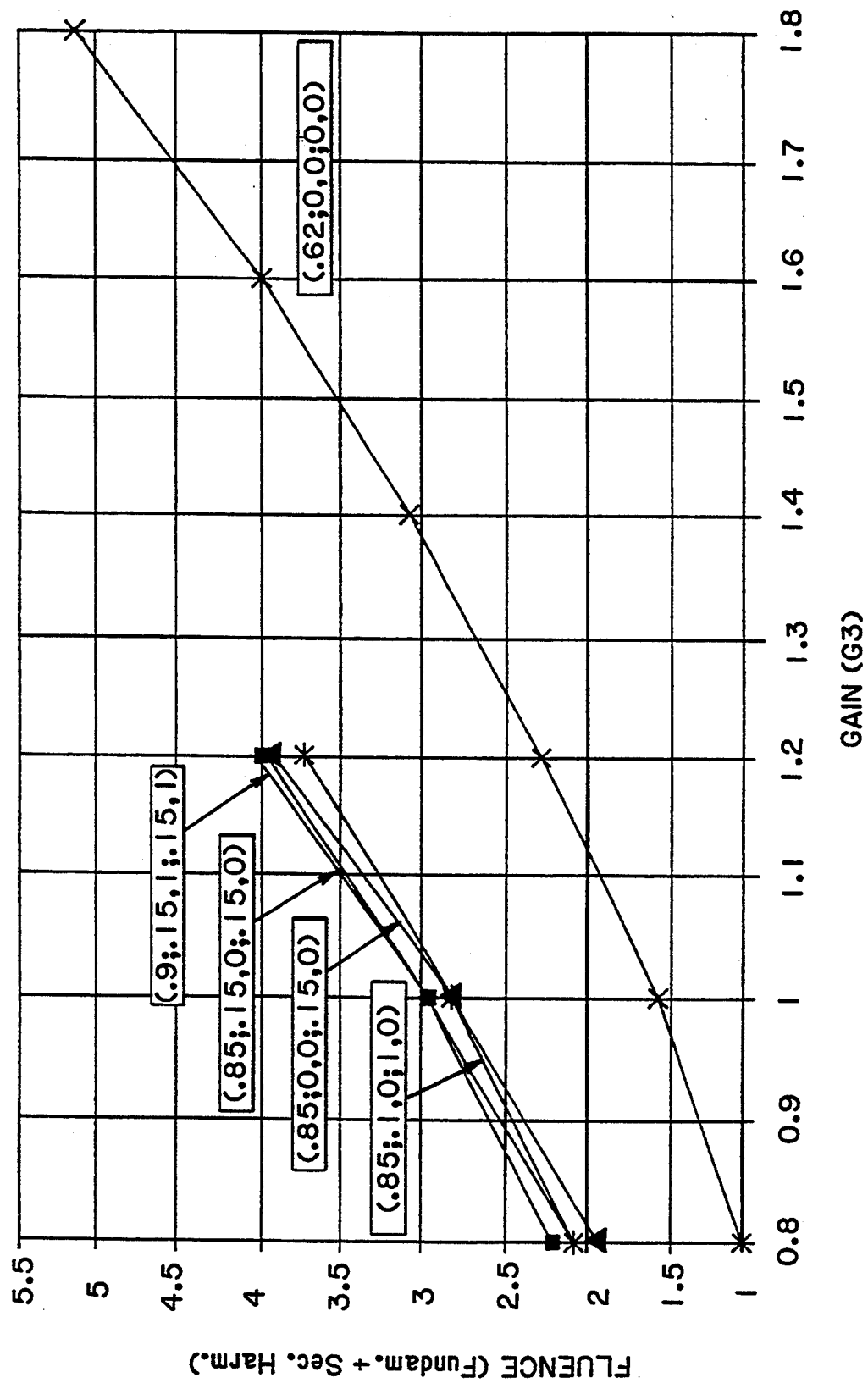
FIG. 5b is a graph that shows, for the same laser radiation, the fluence (optical energy density) on the input face of a nonlinear crystal that is a component of the resonators of FIGS. 4a and 4b.
Figure 6:
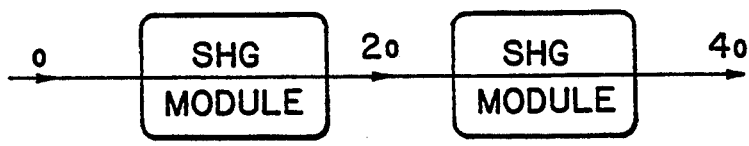
FIG. 6 schematically illustrates a fourth harmonic generator that includes two cascaded second harmonic generators.

The use of optical feedback leads to greater performance improvements for THGs and FHGs, which include two cascaded frequency mixing processes. FIGS. 4a and 4b illustrate two representative THG embodiments, while FIG. 6 shows a schematic for a FHG. FIGS. 5a and 5b illustrate THG conversion results for the case of a super-Gaussian (n=3) laser input beam and a Gaussian pulse. Without feedback (lowest trace), the maximum conversion efficiency is approximately 50 percent, but with small amounts of feedback, efficiencies of approximately 80 percent are obtained, at lower fluence (optical energy density) levels. Even higher efficiencies are achieved using tapered reflectivities for generating the feedback. It should also be noted that high efficiencies may be obtained even with feedback on only one of the input beams, curve (0,0; 0.15,0), which reduces the device complexity.

In FIGS. 4a and 4b the illustrated embodiments each include a cascade of a SHG module, which may be identical to that shown in FIG. 1a, or may employ a conventional, non-feedback design, and a frequency mixer (o+2o→3o). FIG. 4a shows a frequency mixer 24 based on a linear resonator, while FIG. 4b shows a frequency mixer 26 having a single, common ring resonator for the o and 2o input fields. Input mirror $M_i$ is a beam splitter, providing approximately two thirds of the input laser energy to the SHG module 10 and (approximately) one third, via mirror $M_r$, to a beam combiner (BC) which is transmissive at o and reflective at 2o. Another mixer embodiment, using two separate ring resonators, is described below in relation to FIG. 8.

FIGS. 5a and 5b show an expected performance for a THG pumped by a super-Gaussian (n=3) beam and a Gaussian pulse shape. More particularly, FIGS. 5a and 5b show the energy conversion efficiency and the fluence (optical energy density) (sum of o and 2o fluences (optical power densities)) on then nonlinear crystal (24a, 26a) input face, respectively. The parameters labeling the curves are ($E_2$; $R_1$, $b_1$; $R_2$, $b_2$) where $E_2$ is the SHG efficiency, $R_1$, $R_2$ are the feedback mirror reflectivities, and $b_1$, $b_2$ describe the reflectivity tapers. The parameters of the SHG module are: $G_2 = 1.5$ and $R_f = 0.15$, b=0, except for case (0.9; 0.15,1; 0.15,1) where $R_f = 0.15$, b=1, and for the no-feedback case where $G_2 = 1.8$ and $R_f = 0$.

Figure 7A:
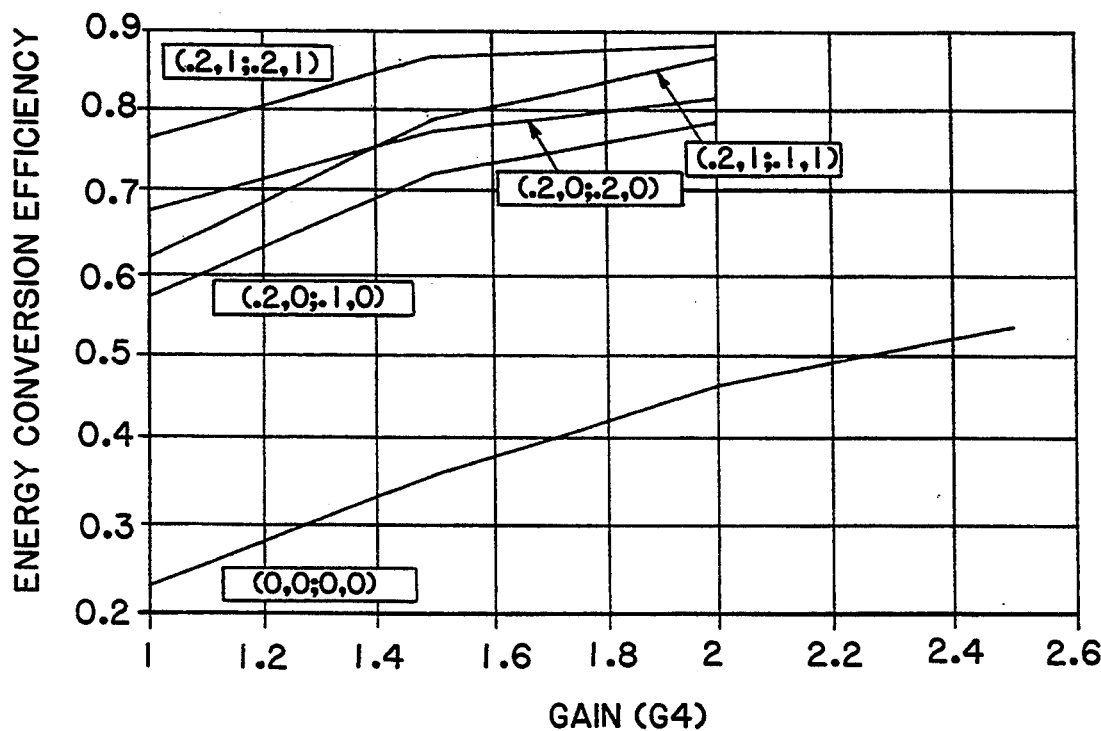
FIG. 7a is a graph that illustrates, for laser radiation having a Gaussian beam and a Gaussian pulse shape, the energy conversion efficiency versus gain for the fourth harmonic generators of FIG. 6.
Figure 7B:
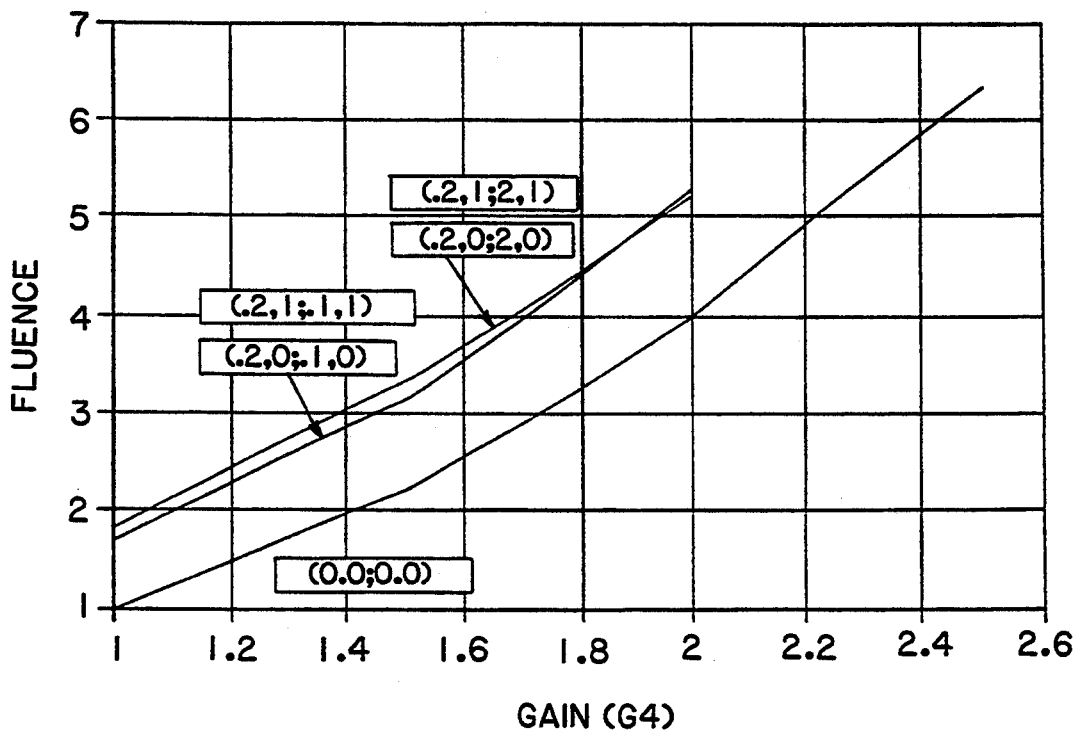
FIG. 7b is a graph that shows, for the same laser radiation, the fluence (optical energy density) on the input face of a nonlinear crystal that is a component of the resonators of FIG. 6.

FIGS. 7a and 7b represent FHG conversion results for the case of a super-Gaussian (n=3) beam and a Gaussian pulse. The first SHG has a gain, $G_2$, of 1.5, while the gain of the second SHG is varied. At a SHG gain of 1.6, with $R_f = 0.2$, an overall efficiency of nearly 80 percent is obtained, as compared to approximately 40 percent without feedback. This increase in conversion efficiency is obtained at a fluence (optical energy density) which is only 50 percent higher in the feedback case compared to the no-feedback case. The parameters labeling the curves are ($R_1$, $b_1$; $R_2$, $b_2$) where $R_1$, $R_2$ are the feedback mirror reflectivities for the two SHG modules, and $b_1$, $b_2$ describe the reflectivity tapers.

Figure 8:
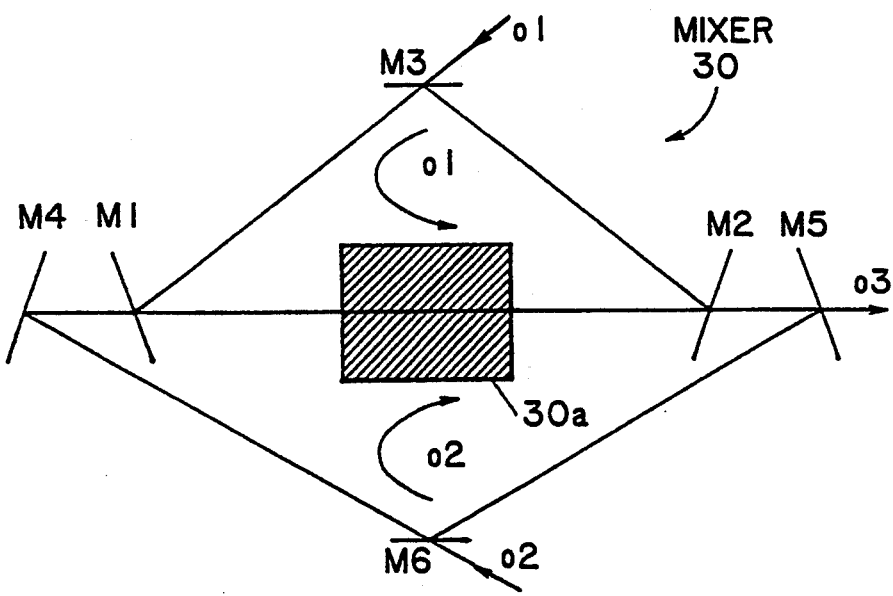
FIG. 8 is a schematic diagram of a non-degenerate mixer that employs two separate ring resonators.

FIG. 8 is a schematic representation of a general, non-degenerate frequency mixer 30. First and second ring resonators are used for $o_1$ and $o_2$, respectively. The ideal mirror reflectivities for this embodiment are:

Mirror M1: $R_1 = 1$ at $o_1$, $R_1 = 0$ at $o_2$
Mirror M2: $R_2 = 1$ at $o_1$, $R_2 = 0$ at $o_2$ and $o_3$
Mirror M3: $R_3 = R_{f1}$ at $o_1$
Mirror M4: $R_4 = 1$ at $o_2$
Mirror M5: $R_5 = 1$ at $o_2$, $R_5 = 0$ at $o_3$
Mirror M6: $R_6 = R_{f2}$ at $o_2$ A number of variations on this embodiment are possible, in particular with respect to the locations where the three beams are coupled into and out of the converter.

Figure 9:
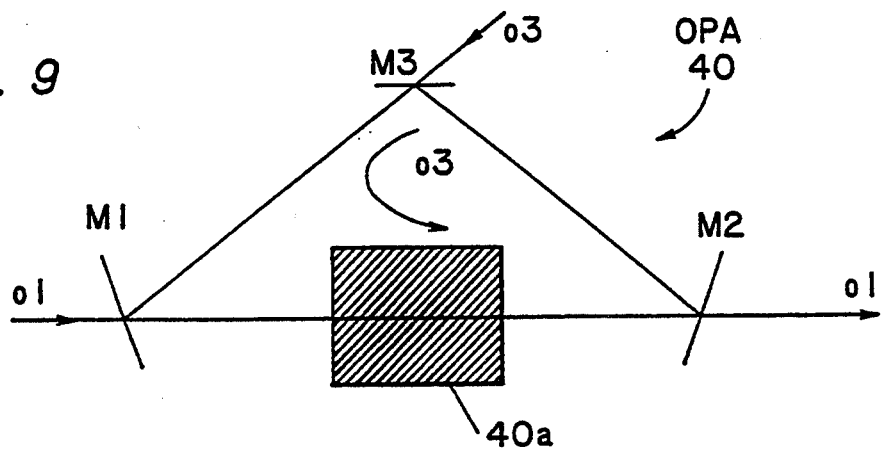
FIG. 9 is a schematic diagram of an optical parametric amplifier (OPA)
Figure 10A:
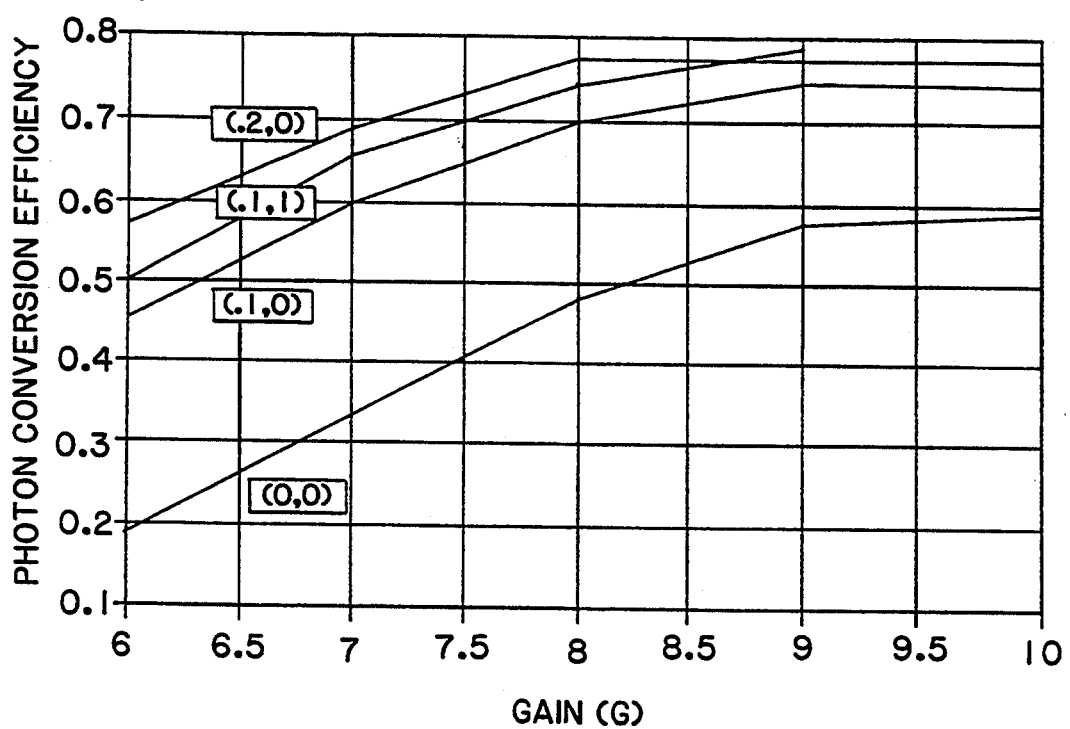
FIG. 10a is a graph that illustrates, for laser radiation having a Gaussian beam and a Gaussian pulse shape, the energy conversion efficiency versus gain for the OPA of FIG. 9.
Figure 10B:
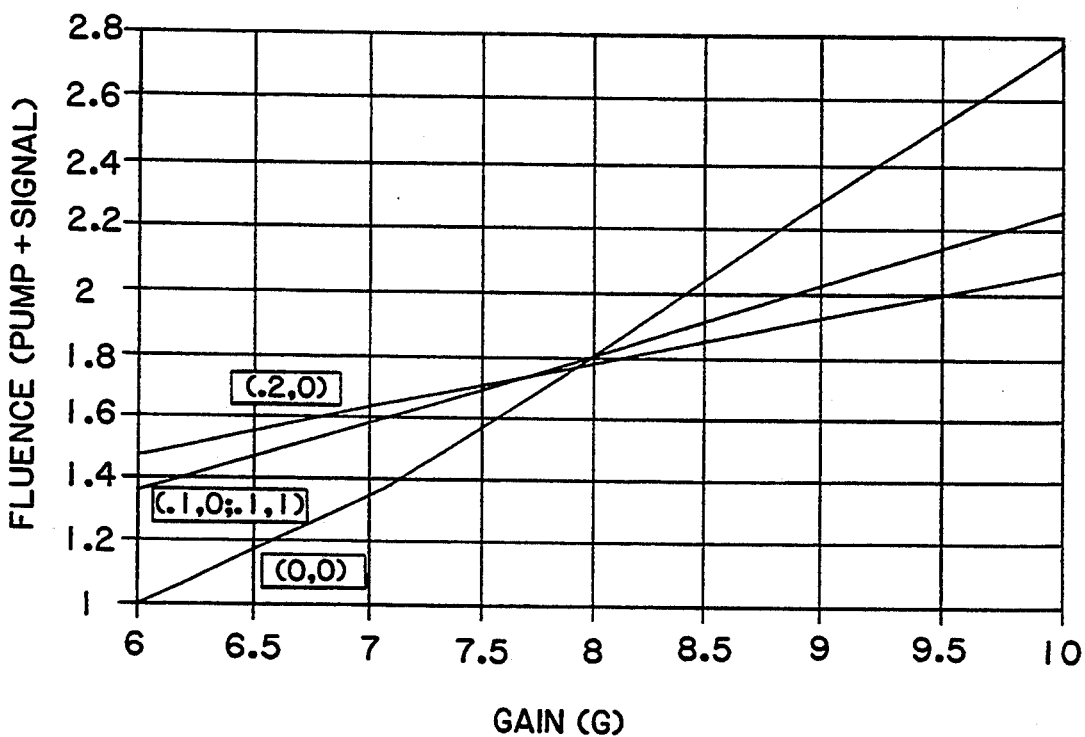
FIG. 10b is a graph that shows, for the same laser radiation, the fluence (optical energy density) on the input face of a nonlinear crystal that is a component of the OPA of FIG. 9.

FIG. 9 is a schematic representation of an OPA 40, while FIGS. 10a and 10b show the photon conversion efficiency and the fluence (optical energy density), respectively, for the case of 1 percent photon injection at $o_1$ (relative to $o_3$). The pump ($o_3$) beam profile and pulse shape are both Gaussian. At a peak gain of 7, a photon conversion efficiency of approximately 70% is obtained with 20% feedback, as compared to a photo conversion efficiency of 33% without feedback. The fluence (optical energy density) on the input face of crystal 40a, with feedback, is only 20% higher than without feedback. The parameters labeling the curves are ($R_p$, $b_p$), where $R_p$ and $b_p$ are the reflectivity of the feedback mirror M3 and its taper parameter, respectively.

Figure 11:
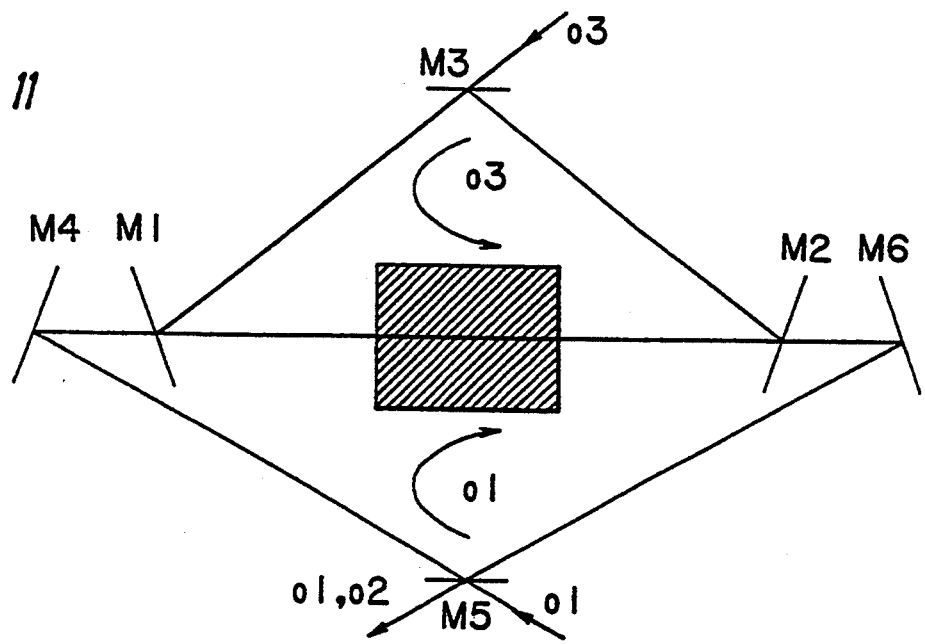
FIG. 11 is a schematic diagram of an optical parametric oscillator (OPO)
Figure 12A:
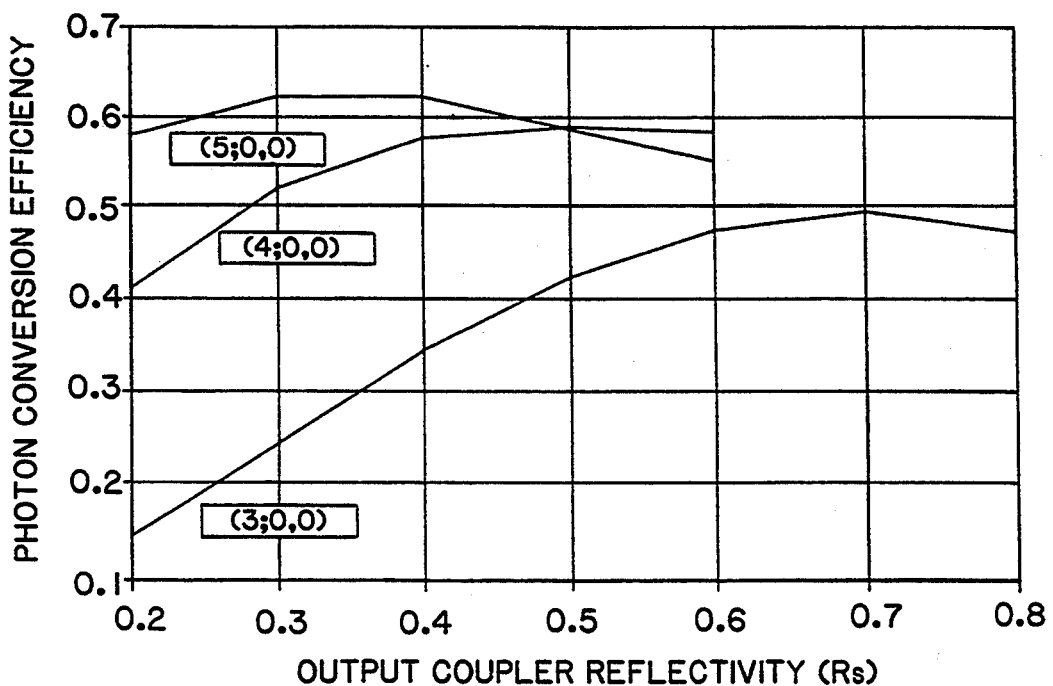
FIG. 12a is a graph that illustrates, for laser radiation having a Gaussian beam and Gaussian pulse shape, and no pump feedback, the energy conversion efficiency versus gain for the OPO of FIG. 11.
Figure 12B:
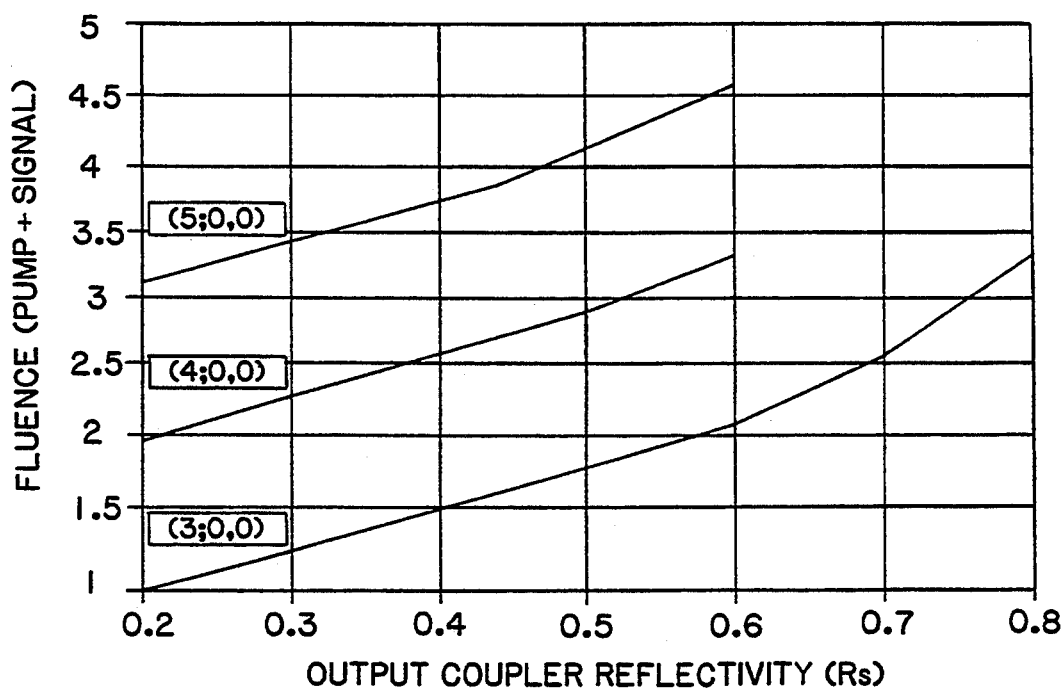
FIG. 12b is a graph that shows, for the same laser radiation, and no pump feedback, the fluence (optical energy density) on the input face of a nonlinear crystal that is a component of the OPO of FIG. 11.
Figure 12C:
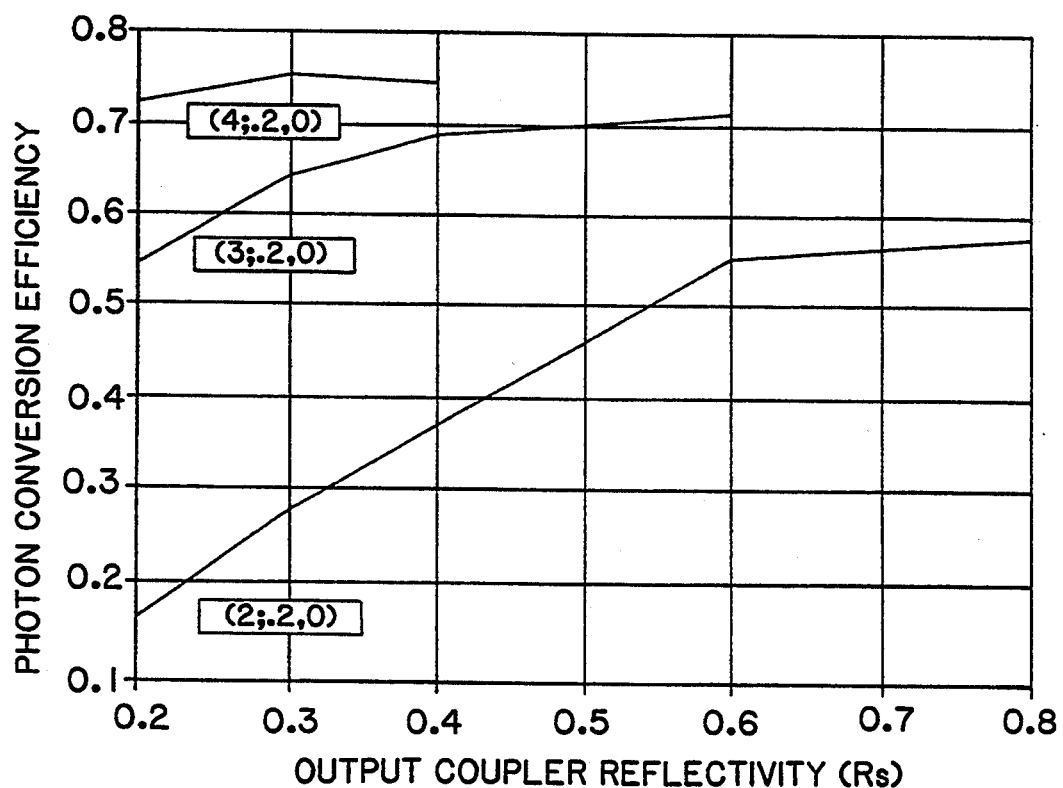
FIG. 12c a graph that illustrates, for laser radiation having a Gaussian beam and a Gaussian pulse shape, and pump feedback, the energy conversion efficiency versus gain for the OPO of FIG. 11.
Figure 12D:
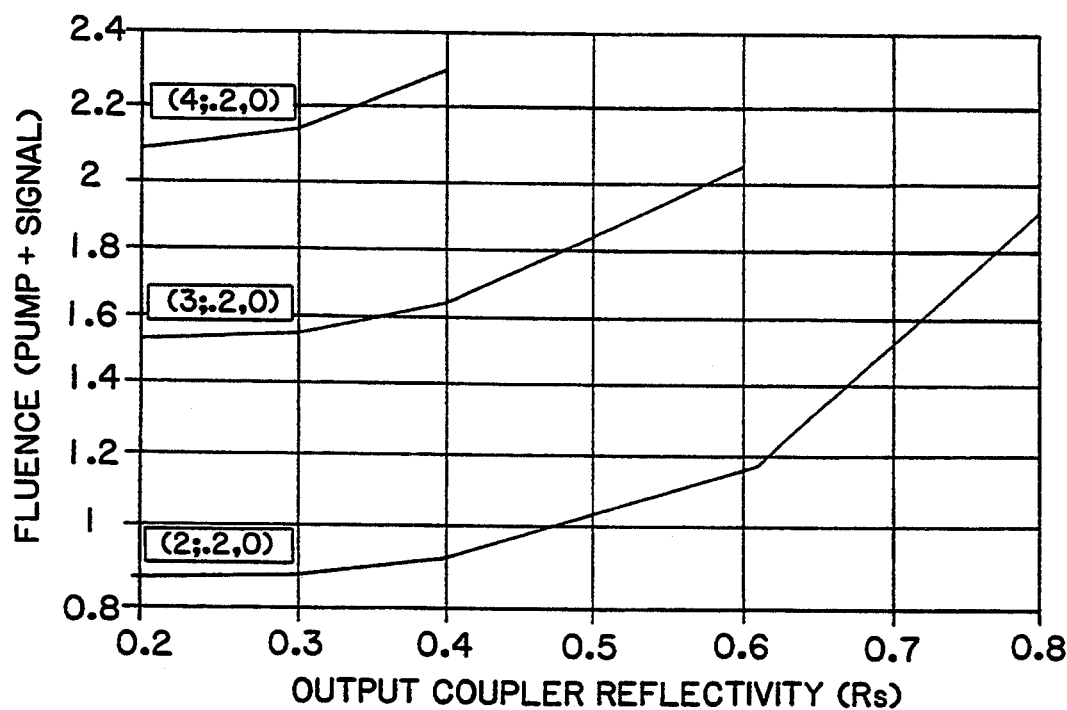
FIG. 12d is a graph that shows, for the same laser radiation, and pump feedback, the fluence (optical energy density) on the input face of a nonlinear crystal that is a component of the OPO of FIG. 11.

In the embodiment of FIG. 9 the signal wave to be amplified is injected through mirror M1. The ideal mirror reflectivities are:

Mirror M1: $R_1 = 0$ at $o_1$, $R_1 = 1$ at $o_3$
Mirror M2: $R_2 = 0$ at $o_1$, $R_2 = 1$ at $o_3$
Mirror M3: $R_3 = R_f$ at $o_3$ FIG. 11 is a schematic representation of, and FIGS. 12a–12d are graphs that illustrate an expected performance for, an injection-seeded parametric oscillator 50. The pump ($o_3$) beam profile and pulse shape are both Gaussian. The photon flux of the signal ($o_1$) seed beam incident on mirror M5 is 1% of the pump beam flux incident on mirror M3. The fluence on the crystal 50a input face is the sum of the $o_1$ fluence and the $o_3$ fluence. With an output coupler (M6) reflectivity of 30% at frequency $o_1$, and a peak gain of 4, a photon conversion efficiency of 50% is obtained without feedback, as compared to 75% with 20% feedback. The fluence is similar in the two cases. Using a tapered feedback, even higher efficiencies are possible, at lower fluence. The parameters labeling the curves of FIGS. 12a–12d are (G; $R_p$, $b_p$) where G is the OPO gain, which is proportional to the square root of the pump ($o_3$) intensity, and $R_p$, $b_p$ are the feedback mirror reflectivity and taper parameters. FIGS. 12a–12b show the photon conversion efficiency and total fluence without feedback, while FIGS. 12c–12d show these quantities for $R_p = 0.2$.

For the embodiment of FIG. 11 the ideal mirror reflectivities are:

Mirror M1: $R_1 = 0$ at $o_1$, $R_1 = 1$ at $o_3$
Mirror M2: $R_2 = 0$ at $o_1$, $R_2 = 1$ at $o_3$
Mirror M3: $R_3 = R_f$ at $o_3$
Mirror M4: $R_4 = 1$ at $o_1$
Mirror M5: $R_5 = 1$ at $o_1$
Mirror M6: $R_6 = R_s$ at $o_1$ The results shown in the graphs of FIGS. 2, 3, 5, 7, 10 and 12 assume zero linear losses in the resonator(s), other than those associated with the feedback mirror, and diffraction losses and beam "walkoff" effects are neglected. In reality, small losses are present due to absorption and scattering in the nonlinear crystal, reflection losses at the crystal faces due to imperfect anti-reflection coatings, and non-ideal mirror reflectivities, i.e. "total" reflectors have reflectivities less than 100%, and totally transmitting optics have transmissivities less than 100%. Because of the relatively small amounts of feedback required by the invention, these losses do not significantly reduce the indicated ideal performance. If beam walkoff occurs for a resonant wave, a pair of crystals may be used to compensate for the beam walkoff.

In summary, the invention teaches a number of different embodiments of optical apparatus for achieving frequency conversion for pulses of laser radiation.

Specifically, the invention provides, in one embodiment, apparatus for increasing the conversion efficiency and/or reducing the energy density in optical frequency doublers (SHGs). The apparatus includes a nonlinear medium (solid, liquid or gas) and a resonator at an input wavelength. The resonator has a linear or ring geometry and contains a partially reflecting mirror through which an input pulse is injected. In accordance with the invention the input mirror has a uniform reflectivity or a tapered reflectivity for providing a predetermined amount of optical feedback, with the amount of optical feedback being optimizing maximum conversion efficiency. The apparatus further includes a mirror which is highly transmissive at the second harmonic wavelength for coupling the second harmonic pulse out of the resonator. The apparatus further includes one or more mirrors which are highly reflective at the input wavelength, and which determine the resonator geometry. Also included is a means for frequency locking the input wavelength to a longitudinal mode of the resonator, or vice versa, as well as optical components, such as mirrors and lenses, to adjust the size of the input beam for the desired intensity.

The invention also provides apparatus for increasing the efficiency and/or reducing the energy density in non-degenerate ($o_1 \neq o_2$) optical frequency mixers. The apparatus includes a nonlinear medium (solid, liquid or gas) and resonators at each of the two input wavelengths. Each of the resonators has a linear or ring geometry and includes a partially reflecting mirror through which an input beam is injected. In accordance with the invention the input mirrors have a uniform reflectivity or a tapered reflectivity for providing a predetermined amount of optical feedback, with the amount of optical feedback being optimized for maximum conversion efficiency. The apparatus further includes a mirror which is highly transmissive at the generated wavelength $o_3 = o_1 + o_2$. The apparatus further includes one or more mirrors which are highly reflective at one or both input wavelength(s), and which determine the geometry of the resonators. Also included is a means for frequency locking each input wavelength to a longitudinal mode of the corresponding resonator, or vice versa, as well as optical components, such as mirrors and lenses, to adjust the size of each input beam for the desired intensity.

In an alternate embodiment of the non-degenerate optical frequency mixer, feedback is applied at only one of the input wavelengths, $o_1$ or $o_2$, and the apparatus includes but one resonator.

In a further embodiment of the invention there is provided an apparatus for increasing the efficiency of and/or reducing the energy density in an optical parametric amplifier. The apparatus includes a nonlinear medium (solid, liquid or gas) and a resonator at an input pump wavelength. The resonator has a linear or ring geometry and includes a partially reflecting mirror through which the input pump beam is injected. In accordance with the invention the partially reflecting mirror has a uniform reflectivity or a tapered reflectivity for providing a predetermined amount of optical feedback, with the amount of optical feedback being optimized for maximum conversion efficiency. The apparatus further includes a mirror which is highly transmissive at the input signal ($o_1$) or an idler ($o_2$) wavelength. The apparatus further includes a mirror which is highly transmissive at the output ($o_1$, $o_2$) wavelengths and also includes one or more mirrors which are highly reflective at the input pump wavelength, and which determine the resonator geometry. Means is provided for frequency locking the pump wavelength to a longitudinal mode of the resonator, or vice versa, as are optical components, such as mirrors and lenses, to adjust the size of the input pump beam for a desired intensity. Also included are further optical components, such as mirrors and lenses, to adjust the size of the input signal and/or idler beam(s).

Further in accordance with the invention there is provided apparatus for increasing the efficiency of, and/or reducing the energy density in, an optical parametric oscillator. The apparatus includes a nonlinear medium (solid, liquid or gas) and a resonator at an input pump wavelength. The resonator has a linear or ring geometry and includes a partially reflecting mirror through which the input pump beam is injected. In accordance with the invention the partially reflecting mirror has a uniform reflectivity or a tapered reflectivity for providing a predetermined amount of optical feedback, with the amount of optical feedback being optimized for maximum conversion efficiency. The apparatus further includes a mirror which is highly transmissive at the generated signal and/or idler wavelength(s) and one or more mirrors which are highly reflective at the input pump wavelength, and which determine the resonator geometry. Also provided is means for frequency locking the pump wavelength to a longitudinal mode of the resonator, or vice versa, and optical components, such as mirrors and lenses, to adjust the size of the input pump beam for a desired intensity. Further optical components, such as mirrors and lenses, are provided to adjust the size of the input signal and/or idler beam(s), if any, to approximately match the pump beam size.

The apparatus that provides an optical parametric oscillator further includes a further resonator at the signal and/or idler wavelength(s) which has a linear or ring geometry and which includes a partially reflective mirror at the signal and/or idler wavelength(s), and through which the signal and/or idler beam(s) is/are coupled out of the resonator. The further resonator has, in the case of an injection-seeded oscillator, a (partially) transmissive mirror at the signal or idler wavelength, through which a signal or idler seed beam is coupled into the resonator, and one or more mirrors which are highly reflective at the signal and/or idler wavelength(s), and which determine the geometry of the further resonator.

Figure 15:
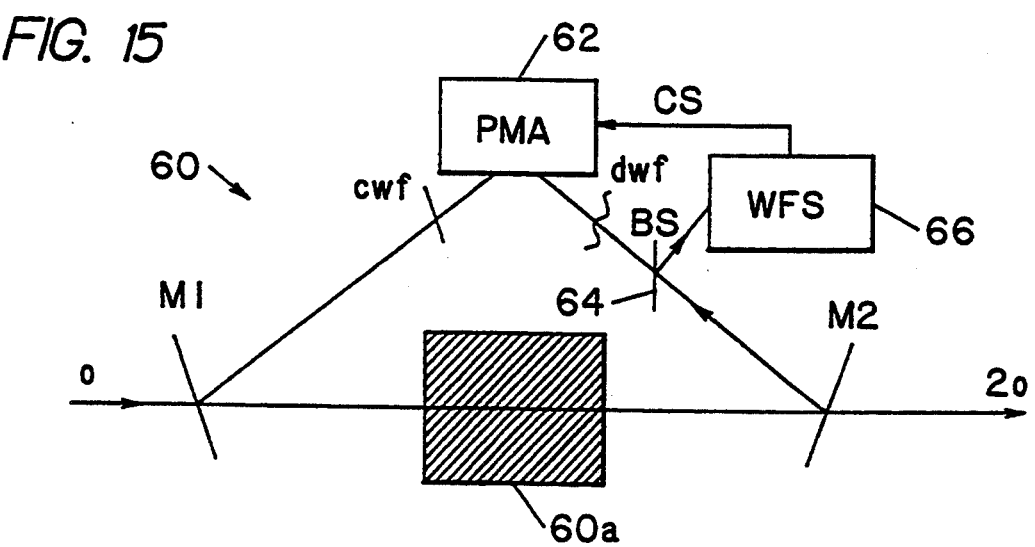
FIG. 15 is a schematic diagram of a second harmonic converter having a phase modulator array.

FIG. 15 illustrates a further embodiment of the invention that compensates an optical frequency conversion apparatus, or SHG 60, for static or time-varying wavefront distortions. A non-linear crystal 60a is disposed within a resonator defined by mirrors M1 and M2, and also by a spatial light modulator, such as a phase modulator array (PMA 62) or a deformable mirror. A beamsplitter (BS) 64 sends a sample of a distorted wavefront (dwf) to a wavefront sensor (WFS) 66 which detects the distorted wavefront and generates a correction signal (CS) to the PMA 62, which then corrects the distorted wavefront to produce a corrected wavefront (cfw). In the SHG 60 the accuracy of the wavefront phase error compensation is such that a coherent buildup of the intra-resonator intensity at an input frequency (o) is achieved over multiple roundtrips. The input pulse of optical radiation is applied through M1, and the frequency-doubled optical component is extracted through M2.

The use of this embodiment of the invention is advantageous in that it enables correction for wavefront distortions resulting from heating of the crystal 60a at high average powers.

Any of the embodiments described above may beneficially provide efficient nonlinear conversion at input intensities lower than those required without feedback. The reduced intensity allows larger beam sizes and correspondingly lower input beam divergences, thereby increasing the conversion efficiency in converter media having small acceptance angles set by phase-matching requirements.

It is further within the scope of the invention to provide, for the resonator(s) on the input beam(s) of the foregoing embodiments, a deformable mirror or phase modulator array to compensate for any phase errors in the nonlinear crystal and the resonator mirrors. These correctable phase errors may be static errors, as well as time-varying errors due to thermal loading by the beam(s).

It is also within the scope of the invention to extend the foregoing teachings to wavelength converters where at least one input, but not all inputs, is/are continuous-wave instead of pulsed.

It is also within the scope of the invention to extend the foregoing teachings to nonlinearities of a higher order. Feedback may be applied at any of the input wavelengths of such frequency converters. As an example, for the frequency mixing process $o_1 + o_2 + o_3 \rightarrow o_4$, feedback can be applied at each of the input wavelengths $o_1$, $o_2$, and $o_3$.

Thus, while the invention has been described with respect to presently preferred embodiments thereof, it will be understood by those skilled in the art that changes in form and detail may be made therein without departing from the scope and spirit of the invention.

What is claimed is:

1. Optical frequency conversion apparatus, comprising:

at least one resonator means having an optical path defined by a plurality of mirrors; and a nonlinear conversion medium disposed within the optical path of said resonator means, said nonlinear medium receiving optical radiation at a first frequency and outputting optical radiation at a second frequency that is a multiple of the first frequency; wherein one of said mirrors is an input mirror for coupling into said at least one resonator means a pulse of radiation having a first frequency;

one of said mirrors is an output mirror for coupling out of said at least one resonator means a pulse of radiation having a frequency that is a function of the first frequency; and wherein means associated with said input mirror for providing a predetermined reflectivity for providing an optical feedback for causing the pulse of radiation within said resonator means to have an intensity sufficient to optimize, over the entire pulse shape and beam profile of the pulse of radiation, a conversion efficiency of said nonlinear conversion medium without exceeding a damage threshold of said nonlinear conversion medium or of any of said plurality of mirrors.

2. Optical frequency conversion apparatus as set forth in claim 1 wherein said predetermined reflectivity means has a substantially uniform profile across a surface of said input mirror.

3. Optical frequency conversion apparatus as set forth in claim 1 wherein said predetermined reflectivity means has a reflectivity profile that varies across a surface of said input mirror.

4. Optical frequency conversion apparatus as set forth in claim 3 wherein the reflectivity profile varies in such a manner as to have a greater reflectivity for portions of the input beam profile that have an intensity below a peak intensity.

5. Optical frequency conversion apparatus as set forth in claim 3 wherein said predetermined reflectivity means has a substantially parabolic profile, and wherein a minimum of the parabolic reflectivity profile is predetermined to coincide with the portion of said input beam that has a greatest intensity.

6. Optical frequency conversion apparatus as set forth in claim 1 and further comprising at least one further resonator means having an optical input that is coupled to the pulse of radiation that is coupled out of said resonator means.

7. Optical frequency conversion apparatus as set forth in claim 1 wherein said resonator means forms a portion of an optical frequency mixer means.

8. Optical frequency conversion apparatus as set forth in claim 1 wherein said at least one resonator means forms a portion of an optical parametric amplifier means.

9. Optical frequency conversion apparatus as set forth in claim 1 wherein said at least one resonator means forms a portion of an optical parametric oscillator means.

10. Optical frequency conversion apparatus as set forth in claim 1 wherein said predetermined reflectivity is less than approximately 50 percent.

11. Optical frequency conversion apparatus as set forth in claim 1 wherein said at least one resonator means forms a portion of a harmonic generator selected from the group consisting of a second harmonic generator, a third harmonic generator, a fourth harmonic generator, and a harmonic generator having an order higher than the fourth.

12. Optical frequency conversion apparatus as set forth in claim 1 wherein the input optical pulse has a Gaussian or super-Gaussian beam profile.

13. Optical frequency conversion apparatus as set forth in claim 1 wherein the input optical beam has an arbitrary beam profile.

14. Optical frequency conversion apparatus as set forth in claim 1 and further including means for frequency locking the input radiation to a longitudinal mode of said resonator means.

15. Optical frequency conversion apparatus as set forth in claim 1 and further including means for frequency locking a longitudinal mode of said resonator means to the input radiation.

16. Optical frequency conversion apparatus as set forth in claim 1 wherein said at least one resonator means includes means for correcting for a wavefront distortion of radiation propagating within said at least one resonator means.

17. A method for use in an optical frequency conversion apparatus for increasing the conversion efficiency or reducing the magnitude of the optical power density at an input of a nonlinear conversion medium, comprising the steps of:

coupling at least one pulse of optical radiation beam into a resonator means, the resonator means including the nonlinear conversion medium, the step of coupling occurring at an input mirror of the resonator means; and providing the input mirror with a predetermined reflectivity for generating an optical feedback within the resonator means, an amount of optical feedback being selected so as to obtain a desired amount of nonlinear conversion efficiency with the nonlinear conversion medium while maintaining the magnitude of the optical power density at or below a level required to obtain the desired amount of nonlinear conversion efficiency without the use of optical feedback.

18. A method as set forth in claim 17 wherein the step of providing provides a reflectivity profile ($R_f$) in accordance with the expression:

$$R_f(r) = R_0 (1 + b(r/w)^2),$$

where r is the radial coordinate, w is a diameter of the beam, $R_0$ is a reflectivity in a center of the beam, and b is a parameter that determines a degree of tapering of the reflectivity profile, wherein for b=0 the reflectivity profile is substantially uniform.

19. A method for use in an optical frequency conversion apparatus for reducing a beam divergence angle in a nonlinear conversion medium, the medium having a predetermined range of acceptance angles, comprising the steps of:

coupling at least one pulse of optical radiation into a resonator means, the resonator means including the nonlinear conversion medium, the step of coupling occurring at an input mirror of the resonator means; and providing the input mirror with a predetermined reflectivity for generating an optical feedback within the resonator means, an amount of optical feedback being selected so as to obtain a desired degree of nonlinear conversion efficiency with the nonlinear conversion medium and with a beam size that is sufficiently large to maintain the beam divergence within the range of acceptance angles of the nonlinear conversion medium.

20. A method as set forth in claim 19 wherein the step of providing provides a reflectivity profile ($R_f$) in accordance with the expression:

$$R_f(r) = R_0 (1 + b(r/w)^2),$$

where r is the radial coordinate, w is a diameter of the beam, $R_0$ is a reflectivity in a center of the beam, and b is a parameter that determines a degree of tapering of the reflectivity profile, wherein for $b=0$ the reflectivity profile is substantially uniform.

21. A method for use in an optical frequency conversion apparatus for compensating for static and time-varying wavefront distortions imposed on an input beam by a nonlinear conversion medium and by resonator optical elements, comprising the steps of:

providing a resonator means with a wavefront corrector means;

coupling at least one pulse of optical radiation into the resonator means, the resonator means including the nonlinear conversion medium, the step of coupling occurring at an input mirror of the resonator means;

detecting a distorted wavefront within the resonator means; and operating the wavefront corrector means, in accordance with the detected distorted wavefront, to substantially compensate a phase error of optical radiation propagating within the resonator means, the accuracy of phase error compensation being sufficient to allow coherent buildup of an intra-resonator intensity at an input frequency over multiple roundtrips with the resonator means.

* * * * *